US008081284B2

(12) United States Patent
Hosaka et al.

(10) Patent No.: US 8,081,284 B2
(45) Date of Patent: Dec. 20, 2011

(54) VIDEO PROCESSING CIRCUIT, LIQUID CRYSTAL DISPLAY DEVICE, ELECTRONIC APPARATUS, AND VIDEO PROCESSING METHOD

(75) Inventors: Hiroyuki Hosaka, Matsumoto (JP); Hidehito Iisaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/030,555

(22) Filed: Feb. 18, 2011

(65) Prior Publication Data

US 2011/0205452 A1 Aug. 25, 2011

(30) Foreign Application Priority Data

Feb. 25, 2010 (JP) ................................ 2010-039795

(51) Int. Cl.
*G02F 1/1345* (2006.01)

(52) U.S. Cl. ............ 349/149; 349/56; 349/84; 349/139; 349/150; 349/151

(58) Field of Classification Search .................... 349/56, 349/84, 139, 149, 150, 151, 152
See application file for complete search history.

(56) References Cited

U.S. PATENT DOCUMENTS 6,476,590 B2 * 11/2002 Chou ............................ 323/284
7,446,824 B2 * 11/2008 Kobayashi et al. ............. 349/33
7,952,556 B2 * 5/2011 Honbo .......................... 345/102

FOREIGN PATENT DOCUMENTS

JP A-6-34965 2/1994
JP A-2009-69608 4/2009

* cited by examiner

*Primary Examiner* — Jennifer Doan
(74) *Attorney, Agent, or Firm* — Oliff & Berridge, PLC

(57) ABSTRACT

A video processing circuit replaces an applied voltage designated by the video signal and applied to a first pixel with a predetermined third voltage, in the case that the applied voltage is lower than the third voltage, the first pixel is abutted on a predetermined application boundary, and the first pixel is surrounded by a risk boundary determined in accordance with a tilt azimuth direction of the liquid crystal on at least two sides.

18 Claims, 28 Drawing Sheets

SCAN LINE DRIVE CIRCUIT

VIDEO PROCESSING CIRCUIT

WITHOUT REPLACEMENT PROCESS

WITH REPLACEMENT PROCESS

TN

VIDEO PROCESSING CIRCUIT, LIQUID CRYSTAL DISPLAY DEVICE, ELECTRONIC APPARATUS, AND VIDEO PROCESSING METHOD

BACKGROUND

1. Technical Field

The present invention relates to a technology for reducing failure on display in a liquid crystal panel.

2. Related Art

Liquid crystal panels have a configuration in which one of a pair of substrates has pixel electrodes corresponding to respective pixels arranged in a matrix, the other substrate has a common electrode disposed so as to be common to all of the pixels, and a liquid crystal is sandwiched between each of the pixel electrodes and the common electrode. In such a configuration, when a voltage corresponding to a grayscale level is applied and held between each of the pixel electrodes and the common electrode, the orientational state of the liquid crystal is defined every pixel, and thus, the transmittance or the reflectance is controlled. Therefore, it can be said that in the configuration described above, only the component out of the electrical field acting on the liquid crystal molecules having a direction (or the opposite direction) from the pixel electrode to the common electrode, namely the direction perpendicular (vertical) to the surface of the substrate makes a contribution to the display control.

Incidentally, as the pixel pitch of the liquid crystal panel is narrowed due to miniaturization and improvement in definition, an electric field generated between the pixel electrodes adjacent to each other, namely the electrical field in a direction (lateral direction) parallel to the surface of the substrate, is generated, and further the influence thereof is becoming nonnegligible. When a lateral electrical field is applied to the liquid crystal to be driven by an electrical field in a vertical direction such as a vertical alignment (VA) liquid crystal or a Twisted Nematic (TN) liquid crystal, there arises a problem that orientation failure (reverse tilt domain) of the liquid crystal is caused to thereby cause failure on display.

In order for reducing the influence of the reverse tilt domain, there are proposed a technology (see, e.g., JP-A-6-34965, FIG. 1) of devising a structure of a liquid crystal panel such as to define the shape of the light blocking layer (an opening section) corresponding to the pixel electrode, a technology (see, e.g., JP-A-2009-69608, FIG. 2) of clipping the video signal equal to or higher than a set value when the average brightness value obtained from the video signal is equal to or lower than a threshold value under the determination that the reverse tilt domain is generated, and so on.

However, the technology of reducing the reverse tilt domain by the structure of the liquid crystal panel has disadvantages that the aperture rate is apt to be lowered, and that the technology is not applicable to the liquid crystal panels having already been manufactured without devising the structure. On the other hand, the technology of clipping the video signal equal to or higher than the set value has a disadvantage that the brightness of the image displayed is limited uniformly to the set value.

SUMMARY

An advantage of some aspects of the invention is to provide a technology for reducing the reverse tilt domain while solving the problems described above.

According to an aspect of the invention, there is provided a video processing circuit adapted to supply a liquid crystal panel, in which liquid crystal is sandwiched between a first substrate provided with pixel electrodes corresponding respectively to pixels and a second substrate provided with a common electrode, and liquid crystal elements are mainly composed of the respective pixel electrodes, the liquid crystal, and the common electrode, with a video signal adapted to designate applied voltages respectively to the liquid crystal elements pixel by pixel, and to define the applied voltages to the respective liquid crystal elements based on a processed video signal, the video processing circuit including a boundary detection section adapted to detect a boundary between a first pixel having an applied voltage, which is designated by the video signal input and is lower than a first voltage, and a second pixel having an applied voltage, which is designated by the video signal input and is one of equal to and higher than a second voltage higher than the first voltage, in a present frame and in a previous frame, which is one frame earlier than the present frame, respectively, an application boundary determination section adapted to determine an application boundary obtained by eliminating an overlap between the boundary of the present frame detected by the boundary detection section and the boundary of the previous frame detected by the boundary detection section from the boundary of the present frame, a risk boundary detection section adapted to detect a risk boundary, which is a part of a boundary between the first pixel having the applied voltage, which is designated by the video signal input and is lower than the first voltage, and the second pixel having the applied voltage, which is designated by the video signal input and is higher than the second voltage higher than the first voltage, and is determined in accordance with a tilt azimuth direction of the liquid crystal, a specifying section adapted to specify the first pixel surrounded by the risk boundary on at least two sides out of the first pixels abutting on the risk boundary, and a replacement section adapted to replace the applied voltage designated by the video signal input and applied to the liquid crystal element corresponding to the first pixel, which is specified by the specifying section, abuts on the application boundary determined by the application boundary determination section, and has the applied voltage designated by the video signal input lower than a predetermined third voltage lower than the first voltage, with the third voltage.

It should be noted that the replacement section can have a configuration of replacing the applied voltage to the liquid crystal element corresponding to each of a predetermined plural number of the first pixels, which are specified by the specifying section, and are placed consecutively to at least one first pixel abutting on the application boundary determined by the application boundary determination section toward a side opposite to the application boundary, with the predetermined third voltage.

Further, according to another aspect of the invention, there is provided a video processing circuit adapted to supply a liquid crystal panel, in which liquid crystal is sandwiched between a first substrate provided with pixel electrodes corresponding respectively to pixels and a second substrate provided with a common electrode, and liquid crystal elements are mainly composed of the respective pixel electrodes, the liquid crystal, and the common electrode, with a video signal adapted to designate applied voltages respectively to the liquid crystal elements pixel by pixel, and to define the applied voltages to the respective liquid crystal elements based on a processed video signal, the video processing circuit including a boundary detection section adapted to detect a boundary between a first pixel having an applied voltage, which is designated by the video signal input and is lower than a first voltage, and a second pixel having an applied voltage, which is designated by the video signal input and is one of equal to and higher than a second voltage higher than the first voltage, in a present frame and in a previous frame, which is one frame earlier than the present frame, respectively, an application boundary determination section adapted to determine an application boundary obtained by eliminating an overlap between the boundary of the present frame detected by the boundary detection section and the boundary of the previous frame detected by the boundary detection section from the boundary of the present frame, a risk boundary detection section adapted to detect a risk boundary, which is a part of a boundary between the first pixel having the applied voltage, which is designated by the video signal input and is lower than the first voltage, and the second pixel having the applied voltage, which is designated by the video signal input and is higher than the second voltage higher than the first voltage, and is determined in accordance with a tilt azimuth direction of the liquid crystal, a specifying section adapted to specify the first pixel surrounded by the risk boundary on at least two sides out of the first pixels abutting on the risk boundary, and a replacement section adapted to replace the applied voltage designated by the video signal input and applied to the liquid crystal element corresponding to the second pixel, which abuts on the first pixel specified by the specifying section, abuts on the application boundary determined by the application boundary determination section, and has the applied voltage designated by the video signal input higher than the second voltage, with a predetermined fourth voltage.

It should be noted that the replacement section can have a configuration of replacing the applied voltage to the liquid crystal element corresponding to each of a predetermined plural number of the second pixels, which abut on at least one first pixel specified by the specifying section, and are placed consecutively to at least one second pixel abutting on the application boundary determined by the application boundary determination section toward a side opposite to the application boundary, with the predetermined fourth voltage.

Further, according to still another aspect of the invention, there is provided a video processing circuit adapted to supply a liquid crystal panel, in which liquid crystal is sandwiched between a first substrate provided with pixel electrodes corresponding respectively to pixels and a second substrate provided with a common electrode, and liquid crystal elements are mainly composed of the respective pixel electrodes, the liquid crystal, and the common electrode, with a video signal adapted to designate applied voltages respectively to the liquid crystal elements pixel by pixel, and to define the applied voltages to the respective liquid crystal elements based on a processed video signal, the video processing circuit including a boundary detection section adapted to detect a boundary between a first pixel having an applied voltage, which is designated by the video signal input and is lower than a first voltage, and a second pixel having an applied voltage, which is designated by the video signal input and is one of equal to and higher than a second voltage higher than the first voltage, in a present frame and in a previous frame, which is one frame earlier than the present frame, respectively, an application boundary determination section adapted to determine an application boundary obtained by eliminating an overlap between the boundary of the present frame detected by the boundary detection section and the boundary of the previous frame detected by the boundary detection section from the boundary of the present frame, a risk boundary detection section adapted to detect a risk boundary, which is a part of a boundary between the first pixel having the applied voltage, which is designated by the video signal input and is lower than the first voltage, and the second pixel having the applied voltage, which is designated by the video signal input and is higher than the second voltage higher than the first voltage, and is determined in accordance with a tilt azimuth direction of the liquid crystal, a specifying section adapted to specify the first pixel surrounded by the risk boundary on at least two sides out of the first pixels abutting on the risk boundary, and a replacement section adapted to replace the applied voltage designated by the video signal input and applied to the liquid crystal element corresponding to the first pixel, which is specified by the specifying section, abuts on the application boundary determined by the application boundary determination section, and has the applied voltage designated by the video signal input lower than a predetermined third voltage lower than the first voltage, with the third voltage, and to replace the applied voltage designated by the video signal input and applied to the liquid crystal element corresponding to the second pixel, which abuts on the first pixel specified by the specifying section, abuts on the application boundary determined by the application boundary determination section, and has the applied voltage designated by the video signal input higher than the second voltage, with a predetermined fourth voltage.

It should be noted that the replacement section can have a configuration of replacing the applied voltage to the liquid crystal element corresponding to each of a predetermined plural number of the first pixels, which are specified by the specifying section, and are placed consecutively to at least one first pixel abutting on the application boundary determined by the application boundary determination section toward a side opposite to the application boundary, with the predetermined third voltage, and replacing the applied voltage to the liquid crystal element corresponding to each of a predetermined plural number of the second pixels, which abut on at least one first pixel specified by the specifying section, and are placed consecutively to at least one second pixel abutting on the application boundary determined by the application boundary determination section toward a side opposite to the application boundary, with the predetermined fourth voltage.

According to the aspects of the invention described above, since there is no need to make a change to the structure of the liquid crystal panel, degradation in aperture ratio is never caused, and it is also possible to apply the invention to the liquid crystal panels having already manufactured without devising the structure.

Further, according to the above aspects of the invention, since the applied voltage to the pixel abutting on the risk boundary out of the pixels having a movement from the previous frame as a result of analysis of the image is corrected, the number of pixels to be corrected in the applied voltage can be reduced compared to the configuration of replacing the dark pixels abutting on the risk boundary without exception.

It should be noted that the invention can be recognized not only as the video processing circuit, but can also be recognized as a liquid crystal display device, an electronic apparatus including the liquid crystal display device, and a video processing method.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Embodiment

Figure 1:
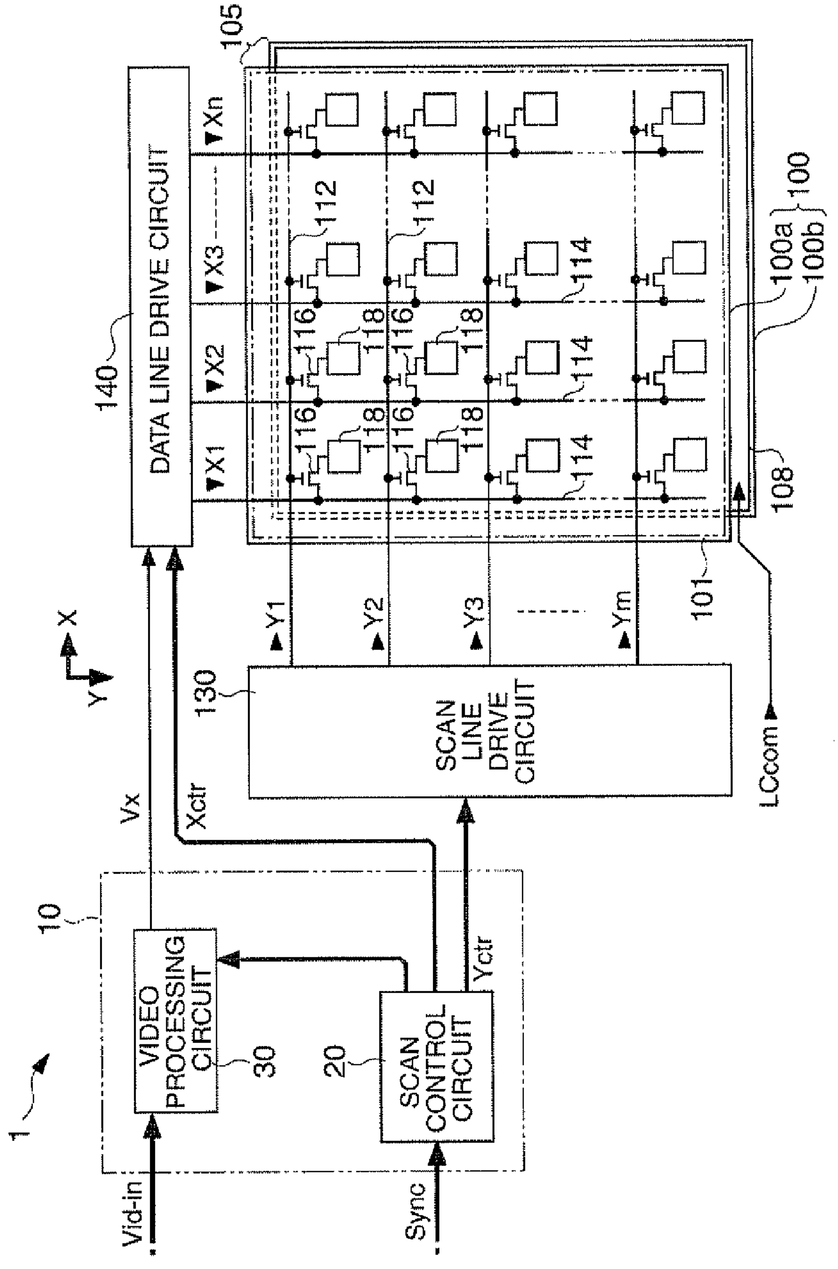
FIG. 1 is a diagram showing a liquid crystal display device to which a video processing circuit according to an embodiment of the invention is applied.

An embodiment of the invention will hereinafter be explained with reference to the drawings. FIG. 1 is a block diagram showing an overall configuration of a liquid crystal display device to which a video processing circuit according to an embodiment of the invention is applied.

As shown in this drawing, the liquid crystal display device 1 has a control circuit 10, a liquid crystal panel 100, a scan line drive circuit 130, and a data line drive circuit 140. Among these constituents, the control circuit 10 is supplied with a video signal Vid-in from a higher-level device in sync with a sync signal Sync. The video signal Vid-in is digital data for respectively designating the grayscale levels of the pixels in the liquid crystal panel 100, and is supplied in the order of the scan with a vertical scan signal, a horizontal scan signal, and a dot clock signal (which are not shown) included in the sync signal Sync. It should be noted that although the video signal Vid-in designates the grayscale levels of the respective pixels, there is no objection to saying that the video signal Vid-in is for designating the applied voltages of the liquid crystal elements since the applied voltages of the liquid crystal elements are determined in accordance with the grayscale levels as described later.

The control circuit 10 is composed of a scan control circuit 20 and a video processing circuit 30. Among these circuits, the scan control circuit 20 generates various types of control signals to thereby control each section in sync with the sync signal Sync. The video processing circuit 30, details of which will be described later, is for processing the video signal Vid-in as a digital signal to thereby output a data signal Vx as an analog signal.

The liquid crystal panel 100 has a configuration in which an element substrate (a first substrate) 100*a* and an opposed substrate (a second substrate) 100*b* are bonded to each other keeping a constant gap, and a liquid crystal 105 to be driven by an electrical field in a vertical direction is sandwiched in the gap.

Among the surfaces of the element substrate 100*a*, an opposed surface to the opposed substrate 100*b* is provided with a plurality ("m" rows) of scan lines 112 disposed along an X (lateral) direction in the drawing and a plurality ("n" columns) of data lines 114 disposed along a Y (vertical) direction while keeping electrical isolation with each of the scan lines 112.

It should be noted that in the present embodiment in order for distinguishing the scan lines 112 from each other, the scan lines 112 are respectively referred to as 1st, 2nd, 3rd, . . . , (m−1)-th, and m-th scan lines in sequence from the top in the drawing in some cases. Similarly, in order for distinguishing the data lines 114 from each other, the data lines 114 are respectively referred to as 1st, 2nd, 3rd, . . . , (n−1)-th, and n-th scan lines in sequence from the left in the drawing in some cases.

The element substrate 100*a* is further provided with sets of an n-channel TFT 116 and a pixel electrode 118 having a rectangular shape and a light transmissive property corresponding respectively to intersections between the scan lines 112 and the data lines 114. The gate electrode of the TFT 116 is connected to the scan line 112, the source electrode is connected to the data line 114, and the drain electrode is connected to the pixel electrode 118.

Incidentally, among the surfaces of the opposed substrate 100*b*, the opposed surface to the element substrate 100*a* is provided with a common electrode 108 having a light transmissive property disposed on the entire surface. The common electrode 108 is provided with a voltage LCcom by a circuit not shown in the drawing.

It should be noted that in FIG. 1 the opposed surface of the element substrate 100*a* is the side facing to the opposed substrate 100*b*. Therefore, the scan lines 112, the data lines 114, the TFTs 116, and the pixel electrodes 118 should be illustrated with broken lines. However, in order for avoiding difficulty in understanding the structure, these elements are all illustrated with solid lines.

Figure 2:
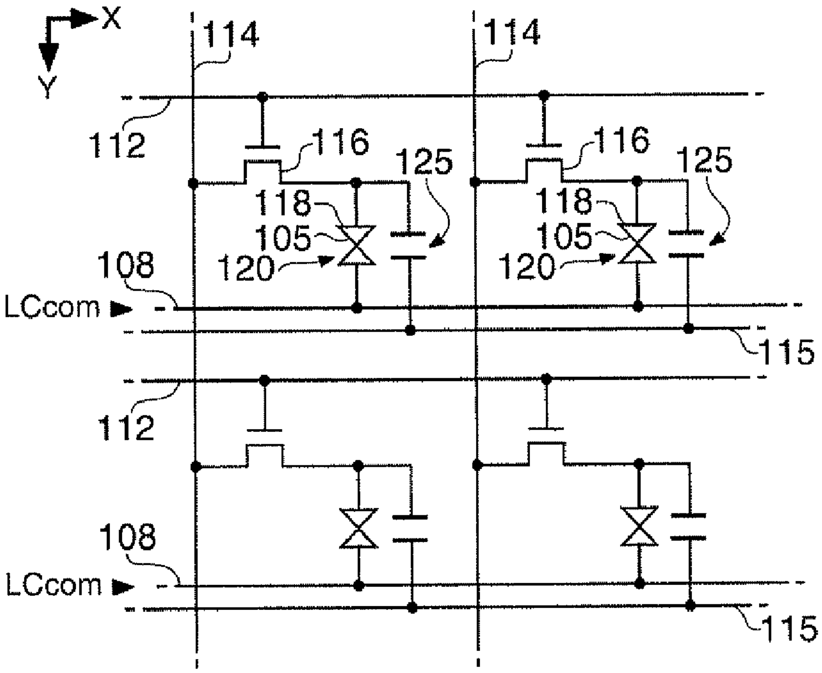
FIG. 2 is a diagram showing an equivalent circuit of a liquid crystal element in the liquid crystal display device.

FIG. 2 is a diagram showing an equivalent circuit of the liquid crystal panel 100. The liquid crystal panel 100 has a configuration in which the liquid crystal elements 120 each having the liquid crystal 105 sandwiched between the pixel electrode 118 and the common electrode 108 are arranged so as to correspond to the intersections between the scan lines 112 and the data lines 114.

Further, although omitted in FIG. 1, an auxiliary capacitor (a storage capacitor) 125 is provided in parallel to each of the liquid crystal elements 120 in practice as shown in FIG. 2. The auxiliary capacitor 125 has one end connected to the pixel electrode 118, and the other end commonly connected to a capacitance line 115. The capacitance line 115 is temporally kept at a constant voltage.

In such a configuration, when the scan line 112 becomes in an H level, the TFT 116 having the gate electrode connected to that scan line becomes in an ON state to thereby connect the pixel electrode 118 to the data line 114. Therefore, by supplying the data line 114 with the data signal having a voltage corresponding to the grayscale when the scan line 112 is in the H level, the data signal is applied to the pixel electrode 118 via the TFT 116 thus set to the ON state. When the scan line 112 becomes in an L level, the TFT 116 becomes in an OFF state, and the voltage applied to the pixel electrode is held by a capacitive property of the liquid crystal element 120 and the auxiliary capacitor 125.

In the liquid crystal element 120, the molecular orientation state of the liquid crystal 105 varies in accordance with an electrical field generated between the pixel electrode 118 and the common electrode 108. Therefore, the liquid crystal element 120 becomes to have a transmittance corresponding to the applied and held voltage if the liquid crystal element 120 is of the transmissive type.

Since in the liquid crystal panel 100 the transmittance varies every liquid crystal element 120, the liquid crystal element 120 corresponds to the pixel. Further, the arrangement area of the pixels corresponds to a display area 101. It should be noted that in the present embodiment the VA type is adopted as the liquid crystal 105, and there is adopted a normally black mode in which the liquid crystal element 120 becomes in a black state when no voltage is applied.

Figure 5A:
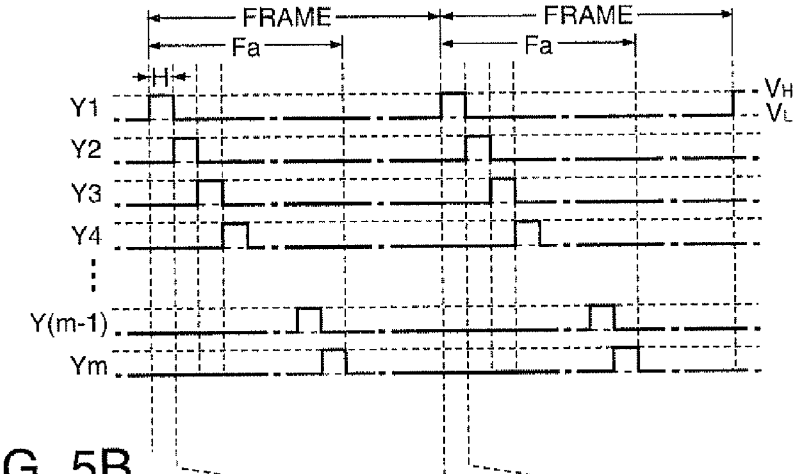
FIGS. 5A and 5B are diagrams showing a display operation in the liquid crystal display device.

The scan line drive circuit 130 supplies the 1st, 2nd, 3rd, . . . , and m-th scan lines 112 with scan signals Y1, Y2, Y3, . . . , and Ym, respectively, in accordance with a control signal Yctr by the scan control circuit 20. In detail, as shown in FIG. 5A, the scan line drive circuit 130 selects the scan lines 112 in the order of the 1st, 2nd, 3rd, . . . , (m−1)-th, and m-th rows throughout the frame, and at the same time, sets the scan signal to the scan line thus selected to a selection voltage $V_H$ (the H level) while setting the scan signals to other scan lines to a non-selection voltage $V_L$ (the L level).

It should be noted that the frame denotes a period in which the video signal Vid-in corresponding to an exposure is supplied, and if the frequency of the vertical scan signal included in the sync signal Sync is 60 Hz, the period of the frame is 16.7 ms, the inverse of the frequency. In the present embodiment, since the 1st, 2nd, 3rd, . . . , and m-th scan lines 112 are selected in sequence throughout the frame, the liquid crystal panel 100 is driven at the same rate as the video signal Vid-in. Therefore, in the present embodiment, the period necessary for making the liquid crystal panel 100 display the image corresponding to one exposure is equal to the frame.

The data line drive circuit 140 samples the data signal Vx supplied from the video processing circuit 30 to the 1st through n-th data lines 114 as data signals X1 through Xn in accordance with the control signal Xctr by the scan control circuit 20.

It should be noted that in the present explanation the voltages except the applied voltage to the liquid crystal element 120 take the ground potential not shown as the reference of the voltage of zero unless otherwise specified. The applied voltage to the liquid crystal element 120 corresponds to an electrical potential difference between the voltage LCcom of the common electrode 108 and the pixel electrode 118, and therefore needs to be distinguished from other voltages. Further, in order for preventing the deterioration in the liquid crystal 105 due to the application of the direct current component, alternating-current drive is performed on the liquid crystal element 120. In detail, the applied voltage is applied to the pixel electrode 118 while being switched alternately between a positive voltage higher than the voltage Vcnt as the center of the amplitude and the negative voltage lower than the voltage Vcnt every frame. In such alternating-current drive, a plane reverse type for setting the writing polarities of all of the liquid crystal elements 120 in the same frame to be the same is adopted in the present embodiment. It should be noted that it is conceivable that the voltage LCcom to be applied to the common electrode 108 is approximately equal to the voltage Vcnt.

Figure 4A:
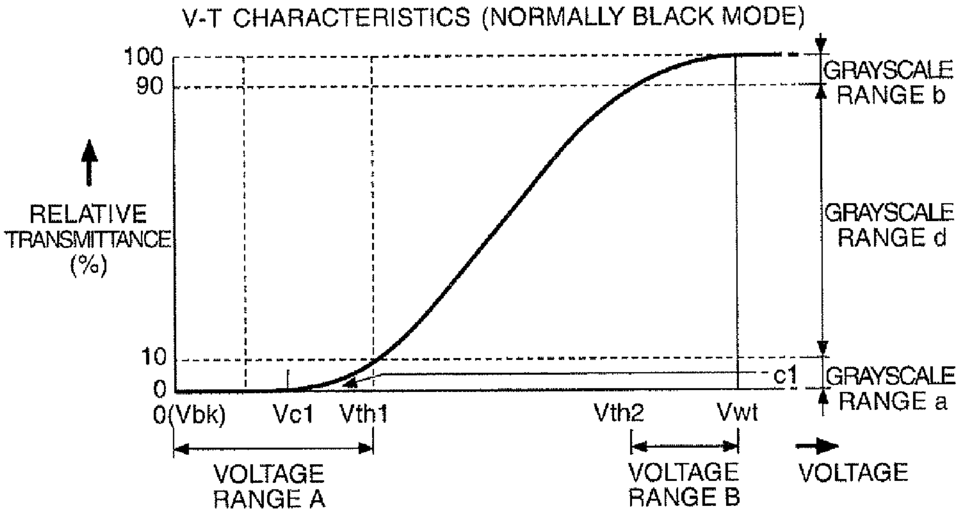
FIGS. 4A and 4B are diagrams showing display characteristics in the liquid crystal display device.

In the present embodiment, the relationship between the applied voltage (V) and the transmittance (T) of the liquid crystal element 120 can be expressed by the V (voltage)-T (transmittance) characteristics shown in FIG. 4A since the normally black mode of the VA type is adopted in the liquid crystal 105. In order for making the liquid crystal element 120 have the transmittance corresponding to the grayscale level designated by the video signal Vid-in, it should be sufficient to apply the voltage corresponding to the grayscale level to the liquid crystal element.

However, if the applied voltage to the liquid crystal element 120 is simply defined in accordance with the grayscale level designated by the video signal Vid-in, failure on display due to the reverse tilt domain occurs in some cases.

Figure 6A:
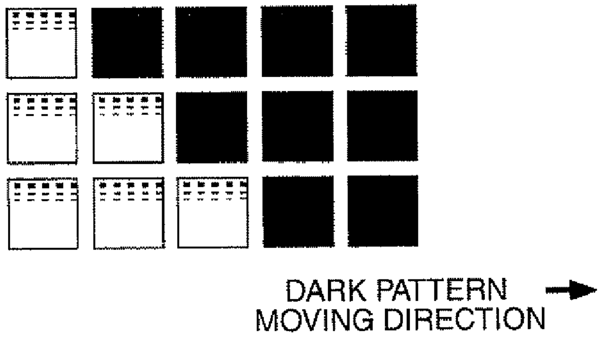
FIGS. 6A and 6B are diagrams showing suppression of the reverse tilt by the video processing circuit.

As shown in FIG. 6A, for example, the failure appears as a kind of a trailing phenomenon that a pixel, which is located at the left edge portion (trailing edge portion of a movement) of a black pattern having consecutive black pixels, and should change from a black pixel to a white pixel, does not change to the white pixel due to generation of the reverse tilt domain when the black pattern moves rightward on the background composed of the white pixels in the image designated by the video signal Vid-in.

It should be noted that from a different viewpoint in FIG. 6A it can be said that when a white pattern having consecutive white pixels moves rightward on the background composed of the black pixels, the pixel, which is located at the right edge portion (the leading edge of the movement) of the white pattern, and should change from the black pixel to the white pixel, does not change to the white pixel due to generation of the reverse tilt domain.

Further, in the drawing, only a part of the image is extracted for the sake of convenience of explanation.

It is conceivable that it is one of the causes of the failure on display due to the reverse tilt domain that the orientation of the liquid crystal molecules is disturbed due to the influence of the lateral electrical field when the liquid crystal molecules sandwiched in the liquid crystal element 120 change from an unstable state to the oriented state corresponding to the applied voltage in accordance with the movement of the image, and it becomes thereafter difficult for the liquid crystal molecules to change to the oriented state corresponding to the applied voltage.

Here, the case of being affected by the lateral electrical field denotes the case in which the electrical potential difference between the pixel electrodes adjacent to each other increases. This is the case in which a dark pixel at the black level (or close to the black level) and a bright pixel at the white level (or close to the white level) are adjacent to each other in the image to be displayed.

Among these pixels, the dark pixel is defined as a pixel of the liquid crystal element 120 having the applied voltage in a voltage range A equal to or higher than a voltage Vbk of the black level in the normally black mode and lower than a voltage Vth1 (a first voltage). Further, the transmittance range (the grayscale range) of the liquid crystal element having the applied voltage to the liquid crystal element in the voltage range A is assumed to be "a" for the sake of convenience.

Then, the bright pixel is defined as a liquid crystal element 120 having the applied voltage in a voltage range B equal to or higher than a voltage Vth2 (a second voltage) and equal to or lower than a white level voltage Vwt in the normally black mode. The transmittance range (the grayscale range) of the liquid crystal element having the applied voltage to the liquid crystal element in the voltage range B is assumed to be "b" for the sake of convenience.

It should be noted that in some cases it is conceivable that in the normally black mode, the voltage Vth1 is an optical threshold voltage for setting the relative transmittance of the liquid crystal element to 10%, and the voltage Vth2 is an optical saturation voltage for setting the relative transmittance of the liquid crystal element to 90%.

Incidentally, the case in which the liquid crystal molecules are in the unstable state denotes the case in which the applied voltage to the liquid crystal element is lower than a voltage Vc (a third voltage). In the case in which the applied voltage to the liquid crystal element is lower than Vc, since the restraining force of the vertical electrical field caused by the applied voltage is weaker than the restraining force due to the oriented film, the orientation state of the liquid crystal molecules are easily disturbed by a tiny external factor. Further, this is because it is apt to take time to respond to the applied voltage if the liquid crystal molecules try to tilt in response to the applied voltage when the applied voltage thereafter exceeds the voltage Vc. Conversely, if the applied voltage is equal to or higher than the voltage Vc, the liquid crystal molecules start to tilt (start to vary the transmittance) in accordance with the applied voltage, and therefore, it can be said that the orientation state of the liquid crystal molecules is in the stable state. In other words, the voltage Vc is in a relationship with the voltage Vth1 defined by the transmittance in which the voltage Vc is lower than the voltage Vth1.

According to the thought described above, it can be said that the pixel, in which the liquid crystal molecules have been in the unstable state before the change, is in a situation in which the reverse tilt domain can easily be caused by the influence of the lateral electrical field when the dark pixel and the bright pixel become adjacent to each other due to the movement of the image. It should be noted that when making a study taking the initial orientation state of the liquid crystal molecules into consideration, there are both of the case in which the reverse tilt domain occurs and the case in which the reverse tilt domain does not occur depending on the positional relationship between the dark pixel and the bright pixel. Therefore, each of these cases will be studied.

Figure 7A:
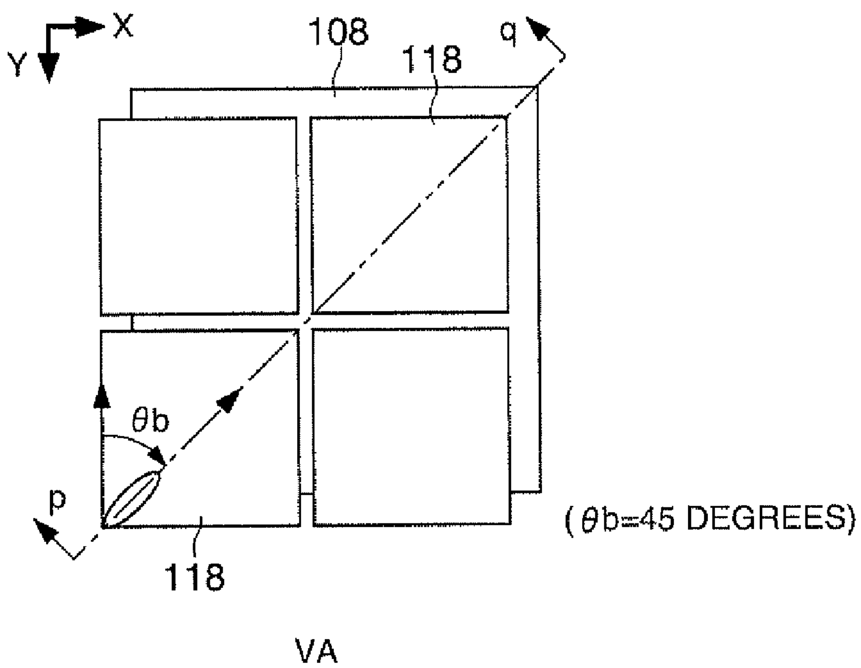
FIGS. 7A and 7B are explanatory diagrams of the initial orientation when a VA type is adopted in a liquid crystal panel.
Figure 7B:
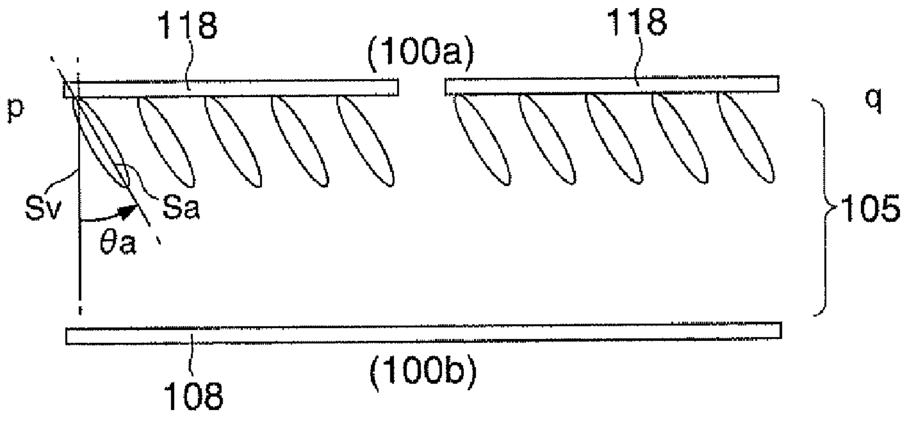

FIG. 7A is a diagram showing the 2×2 pixels adjacent to each other in both of lateral and vertical directions in the liquid crystal panel 100, and FIG. 7B is a simplified cross-sectional diagram when breaking the liquid crystal panel 100 with a vertical plane including the line p-q shown in FIG. 7A, and in particular a diagram showing the state of the liquid crystal molecules.

It is assumed that as shown in these drawings, the liquid crystal molecules of the VA type are initially oriented with the tilt angle of θa and the tilt azimuth angle of θb (=45 degrees) in the state in which the electrical potential difference (the applied voltage to the liquid crystal element) between the pixel electrode 118 and the common electrode 108 is set to zero.

Here, since the reverse tilt domain is caused by the lateral electrical field between the pixel electrodes 118 as described above, the behavior of the liquid crystal molecules on the element substrate 100*a* side provided with the pixel electrodes 118 becomes controversial. Therefore, the tilt azimuth angle and the tilt angle of the liquid crystal molecules are defined with reference to the side of the pixel electrodes 118 (the element substrate 100*a*).

In detail, as shown in FIG. 7B, the tilt angle θa is defined as an angle which the long axis Sa of the liquid crystal molecule forms with reference to the normal line Sv of the substrate when the long axis Sa tilts around one of the ends of the long axis Sa located on the side of the pixel electrode 118 so that the other of the ends located on the side of the common electrode 108 rotates. Incidentally, the tilt azimuth angle θb is defined as an angle formed by a plane normal to the substrate (the normal plane including the line p-q) including the long axis Sa and the normal line Sv of the substrate with reference to a plane normal to the substrate along the Y direction as the arranging direction of the data lines 114. It should be noted that the tilt azimuth angle θb is defined as an angle obtained by defining the rotational angle from the upward direction in the drawing (the opposite direction to the Y direction) to the direction (the upper right direction in FIG. 7A) starting from one of the ends of the long axis of the liquid crystal molecule toward the other of the ends in clockwise in a plan view from the side of the pixel electrode 118 toward the common electrode 108.

Further, it is assumed that similarly in a plan view from the side of the pixel electrode 118, the direction (the upper right direction in FIG. 7A) from one end of the liquid crystal molecule on the pixel electrode side toward the other end thereof is referred to as a downstream side of the tilt azimuth direction for the sake of convenience, and in contrast, the direction (the lower left direction) from the other end toward the one end is referred to as an upstream side of the tilt azimuth direction for the sake of convenience.

Figure 8A:
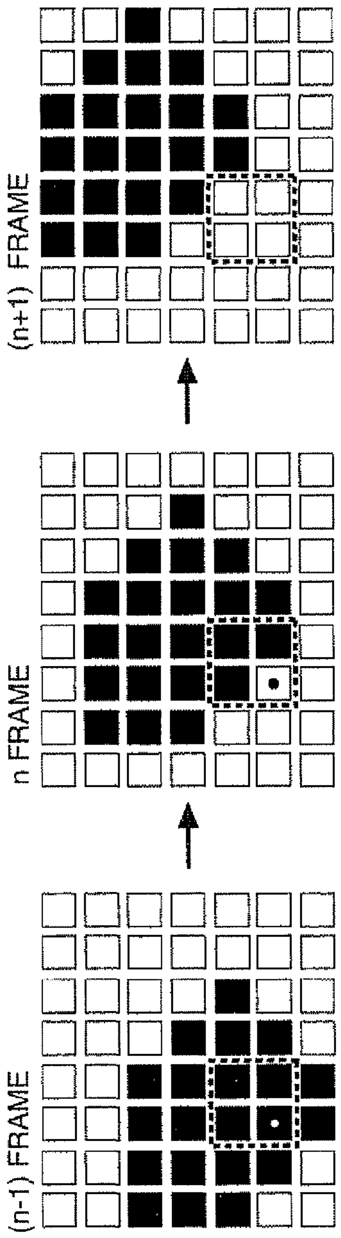
FIGS. 8A through 8C are diagrams for explaining motions of an image in the liquid crystal panel.
Figure 9A:
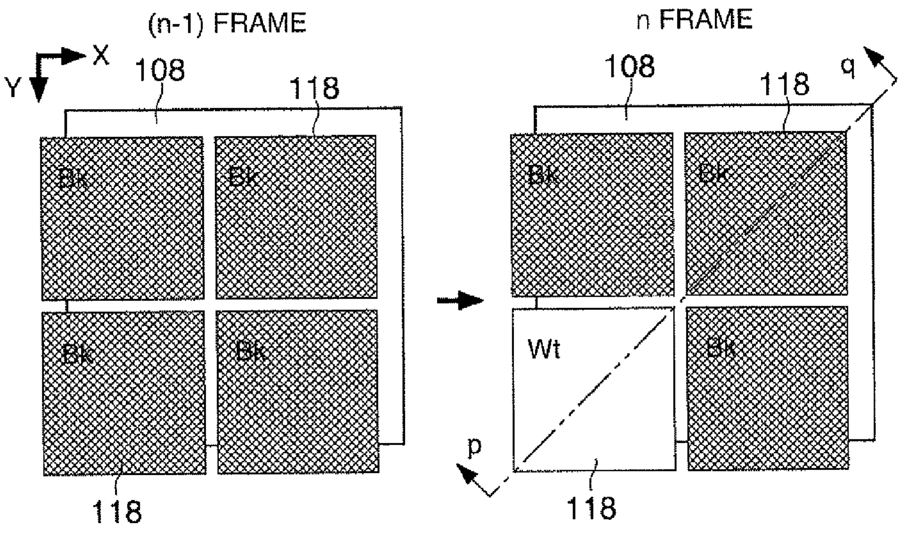
FIGS. 9A through 9C are explanatory diagrams of the reverse tilt generated in the liquid crystal panel.

In the liquid crystal panel 100 using the liquid crystal 105 having such initial orientation, attention is focused on four pixels of "2×2" surrounded by the broken lines as shown in FIG. 8A, for example. FIG. 8A shows the case in which a pattern composed of the pixels (black pixels) at the black level moves in the upper right direction by one pixel every frame on the background of the area composed of the pixels (white pixels) at the white level. In this case, as shown in FIG. 9A, the state of the four pixels of 2×2 changes from the state in which all of the pixels are black in the (n−1)-th frame to the state in which the lower left pixel alone is the white pixel in the n-th frame.

Figure 9B:
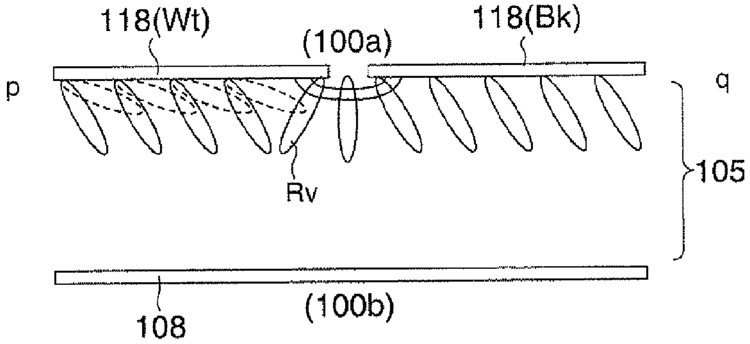

As described above, in the normally black mode the applied voltage, namely the electrical potential difference between the pixel electrode 118 and the common electrode 108, is higher in the white pixel than in the black pixel. Therefore, in the lower left pixel to be changed from black to white, the liquid crystal molecules are biased to tilt in the normal direction (the horizontal direction to the substrate surface) to the electrical field direction from the state illustrated with solid lines to the state illustrated with broken lines as shown in FIG. 9B.

However, the electrical potential difference generated in the gap between the pixel electrode 118 (Wt) of the white pixel and the pixel electrode 118 (Bk) of the black pixel is comparable to the electrical potential difference generated between the pixel electrode 118 (Wt) of the white pixel and the common electrode 108, and moreover, the gap between the pixel electrodes is narrower than the gap between the pixel electrode 118 and the common electrode 108. Therefore, in comparison in the intensity of the electrical field, the lateral electrical field generated in the gap between the pixel electrode 118 (Wt) and the pixel electrode 118 (Bk) is stronger than the vertical electrical field generated between the pixel electrode 118 (Wt) and the common electrode 108.

Since the lower left pixel has been the black pixel with the liquid crystal molecules in the unstable state in the (n−1)-th frame, it takes time until the liquid crystal molecules tilt in accordance with the intensity of the vertical electrical field. On the other hand, the lateral electrical field from the pixel electrode 118 (Bk) adjacent thereto is stronger than the vertical electrical filed caused by the application of the voltage in the white level to the pixel electrode 118 (Wt). Therefore, in the pixel to be changed to the white pixel, as shown in FIG. 9B, the liquid crystal molecules Rv located on the side adjacent to the black pixel become in the reverse tilt state temporally prior to other liquid crystal molecules biased to tilt in accordance with the vertical electrical field.

Figure 9C:
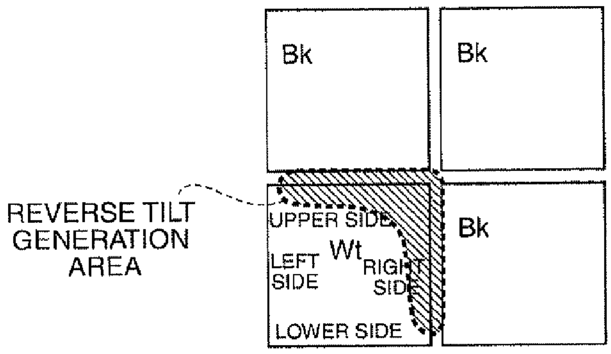

The liquid crystal molecules Rv having become in the reverse tilt state earlier affect negatively the motion of other liquid crystal molecules biased to tilt in the direction parallel to the substrate as illustrated with the broken lines in accordance with the vertical electrical field. Therefore, the area where the reverse tilt occurs in the pixel to be changed to the white pixel spreads across a wide area beyond the gap between the pixel to be changed to the white pixel and the black pixel so as to eat into the pixel to be changed to the white pixel as shown in FIG. 9C.

Figure 8B:
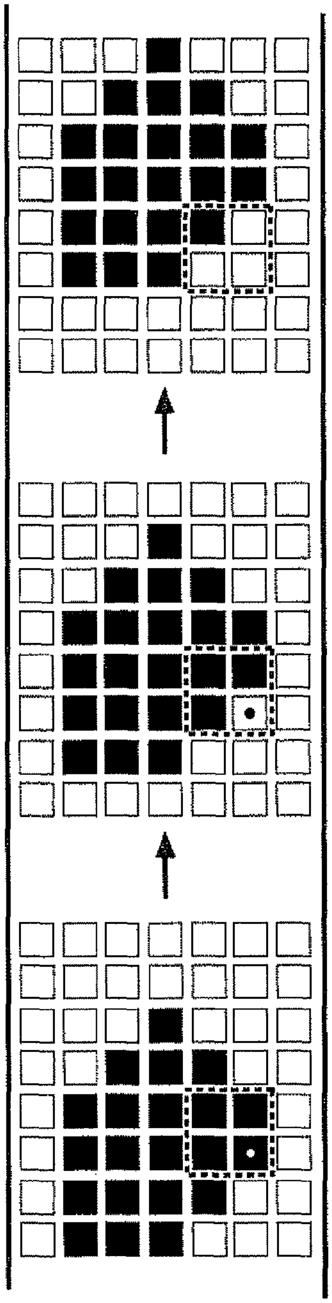
Figure 8C:
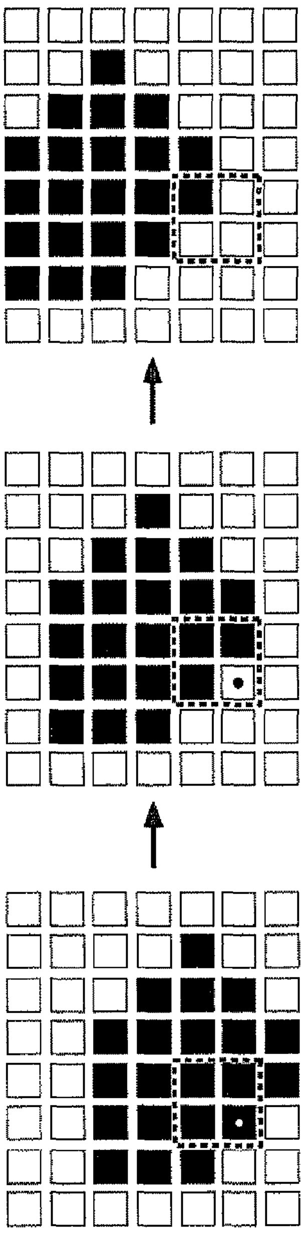

It should be noted that the variation in the pattern shown in FIG. 9A occurs not only in the example shown in FIG. 8A, but also in the case in which the pattern composed of the black pixels moves rightward by one pixel every frame as shown in FIG. 8B, or in the case in which the pattern composed of the black pixels moves upward by one pixel every frame as shown in FIG. 8C. Further, as in the case of changing the viewpoint in the explanation of FIG. 6A, the variation in the pattern also occurs in the case in which the pattern composed of the white pixels moves in an upper right direction, rightward, or upward by one pixel every frame on the background of the area composed of the black pixels.

Figure 10A:
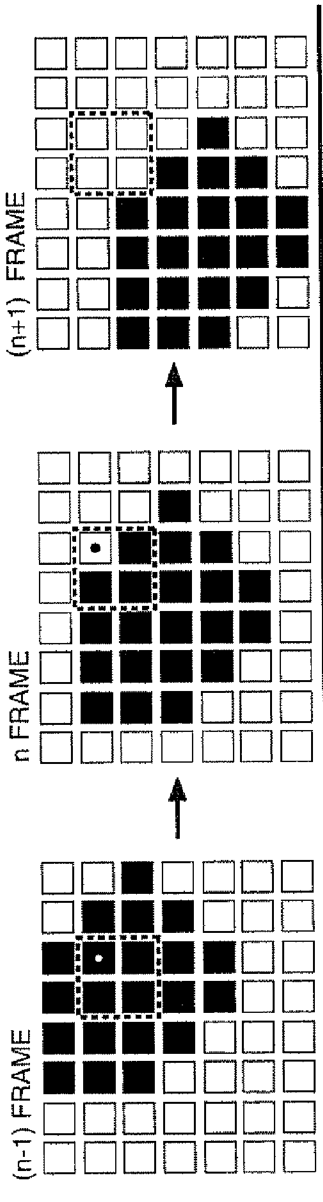
FIGS. 10A through 10C are diagrams for explaining motions of an image in the liquid crystal panel.

Then, attention is focused on the four pixels of 2×2 surrounded by the broken lines in the case in which the pattern composed of the black pixels moves by one pixel every frame in a lower left direction on the background of the area composed of the white pixels as shown in FIG. 10A in the liquid crystal panel 100. In this case, as shown in FIG. 11A, the state of the four pixels of 2×2 changes from the state in which all of the pixels are black in the (n−1)-th frame to the state in which the upper right pixel alone is the white pixel in the n-th frame.

Even after the change described above, the lateral electrical field stronger than the vertical electrical field in the gap between the pixel electrode 118 (Wt) and the common electrode 108 is generated in the gap between the pixel electrode 118 (Bk) of the black pixel and the pixel electrode 118 (Wt) of the white pixel. Due to the lateral electrical field, as shown in FIG. 11B, in the black pixel, the liquid crystal molecules Rv located on the side adjacent to the white pixel are varied in the orientation temporally prior to other liquid crystal molecules biased to tilt in accordance with the vertical electrical field, and thus become in the reverse tilt state. However, since in the black pixel the vertical electrical field does not vary from the (n−1)-th frame, other liquid crystal molecules are hardly affected. Therefore, as shown in FIG. 11C, the area where the reverse tilt occurs in the pixel not changing from the black pixel is negligibly narrow compared to the example shown in FIG. 9C.

Incidentally, in the upper right pixel out of the four pixels of 2×2, which changes from black to white, since the initial orientation direction of the liquid crystal molecules is the direction hardly affected by the lateral electrical field, the liquid crystal molecules becoming in the reverse tilt state hardly exist even if the vertical electrical field is applied. Therefore, in the upper right pixel, the liquid crystal molecules correctly tilt in the direction parallel to the substrate as illustrated with the broken lines in FIG. 11B as the intensity of the vertical electrical field increases. As a result, since the upper right pixel changes to the aimed white pixel, deterioration of the display quality hardly occurs.

Figure 10B:
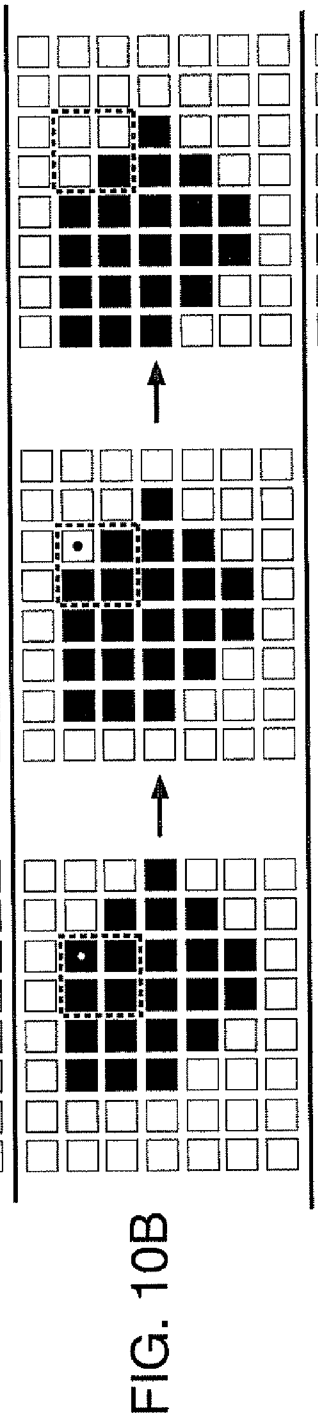
Figure 10C:
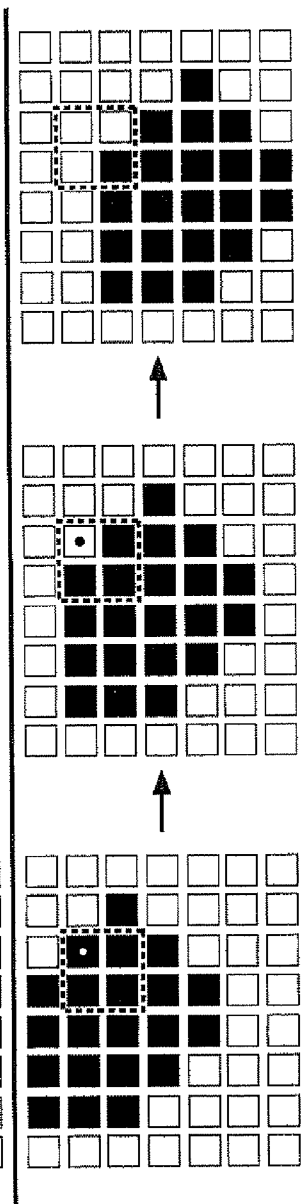
Figure 11A:
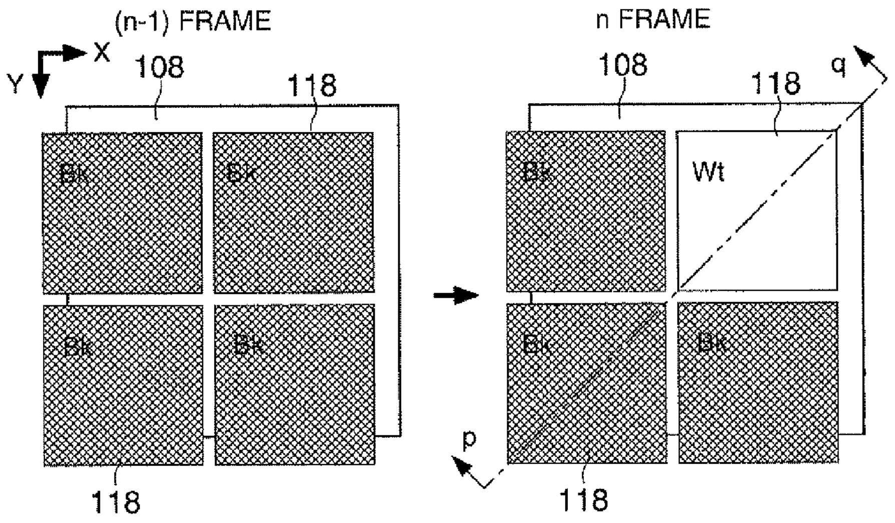
FIGS. 11A through 11C are explanatory diagrams of the reverse tilt generated in the liquid crystal panel.
Figure 11B:
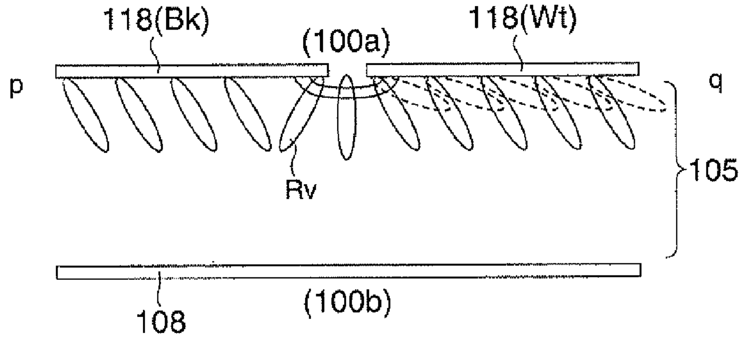
Figure 11C:
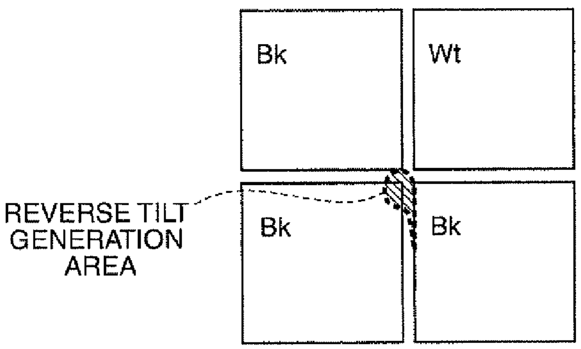

It should be noted that the variation in the pattern shown in FIG. 11A occurs not only in the example shown in FIG. 10A, but also in the case in which the pattern composed of the black pixels moves leftward by one pixel every frame as shown in FIG. 10B, or in the case in which the pattern composed of the black pixels moves downward by one pixel every frame as shown in FIG. 10C.

Summarizing once the situation described with reference to FIGS. 7A through 11C, it can be said that in the case of setting the tilt azimuth angle θb to 45 degrees in the VA type (in the normally black mode), when focusing attention to a certain nth frame, and all of the following requirements are fulfilled, the reverse tilt domain is apt to occur in the nth frame.

That is, the reverse tilt is apt to occur in the bright pixel:

1. if the dark pixel and the bright pixel are adjacent to each other, namely the pixel with a low applied voltage and the pixel with a high applied voltage are adjacent to each other, to thereby make the lateral electrical field strong focusing attention to the n-th frame;
2. if the bright pixel (with a high applied voltage) is located on the lower left side, left side, or lower side corresponding to the upstream side of the tilt azimuth direction in the liquid crystal molecules with respect to the dark pixel (with a low applied voltage) in the n-th frame; and
3. if the pixel to be changed to the bright pixel in the n-th frame has had the liquid crystal molecules in the unstable state in the previous (n−1)-th frame as the previous frame.

In other words, the condition of generating the reverse tilt domain in the bright pixel fulfilling the positional relationships of the requirement 1 and the requirement 2 in the n-th frame is the requirement 3, namely the liquid crystal molecules are in the unstable state in the (n−1)-th frame as the previous frame.

It should be noted that the requirement 1 is substantially equivalent to detecting the boundary on which the dark pixel and bright pixels are adjacent to each other out of the image represented by the video signal Vid-in. Further, the requirement 2 is equivalent to extracting the portion of the boundary thus detected having the dark pixel located above the boundary and the bright pixel located below the boundary, and the portion of the boundary having the dark pixel located on the right of the boundary and the bright pixel located on the left of the boundary. It should be noted that it is assumed that the extracted portions of the boundary thus detected are referred to as a "risk boundary" as described later.

Incidentally, FIGS. 8A through 8C show the case in which the four pixels of 2×2 are all the black pixels in the (n−1)-th frame and have the lower left pixels only become the white pixels in the subsequent n-th frame as an example. However, in general, the motion appears not only in the (n−1)-th frame and the n-th frame, but the similar motion also appears throughout several anterior and posterior frames including these frames. Therefore, if the reverse tilt domain occurs, it is conceivable that in the dark pixel (the pixel provided with a white circular dot) having had the liquid crystal molecules in the unstable state in the (n−1)-th frame, the bright pixel borders the dark pixel on the lower left side, the left side, or the lower side thereof in many cases as shown in FIGS. 8A through 8C considering the motion of the image pattern.

Therefore, in the case in which the dark pixel and the bright pixel are adjacent to each other and the dark pixel is located on the upper right side, the right side, or the upper side with respect to the bright pixel in the image represented by the video signal Vid-in in the previous (n−1)-th frame, if the voltage with which the liquid crystal molecules do not become in the unstable state is applied to the liquid crystal element corresponding to the dark pixel, it might be possible to prevent the reverse tilt from occurring in the n-th frame since the requirement 3 is never fulfilled even if the requirement 1 and the requirement 2 are fulfilled in the n-th frame due to the motion of the image pattern.

Rephrasing the above using the risk boundary while setting back the time reference as much as 1 frame, it denotes that if in the n-th frame, on the boundary on which the dark pixel and the bright pixel border each other in the image represented by the video signal Vid-in, the portion of the boundary having the dark pixel located on the upper side and the bright pixel located on the lower side and the portion thereof having the dark pixel located on the right and the bright pixel located on the left are detected as the risk boundary, and the voltage with which the liquid crystal molecules do not become in the unstable state is applied to the liquid crystal element corresponding to the dark pixel abutting on the risk boundary, the requirement 3 is never fulfilled even if the requirement 1 and the requirement 2 are fulfilled in the subsequent (n+1)-th frame. Therefore, it might be possible to prevent the reverse tilt from occurring in the oncoming (n+1)-th frame.

However, applying the voltage with which the liquid crystal molecules do not become in the unstable state to the liquid crystal element corresponding to the dark pixel is nothing more or less than generating display departure in which an image not based on the video signal Vid-in is displayed in essence. Therefore, from the viewpoint of reducing the pixels constituting the display departure as described above as much as possible, the requirements 1 through 3 described above will be reconsidered.

Figure 12A:
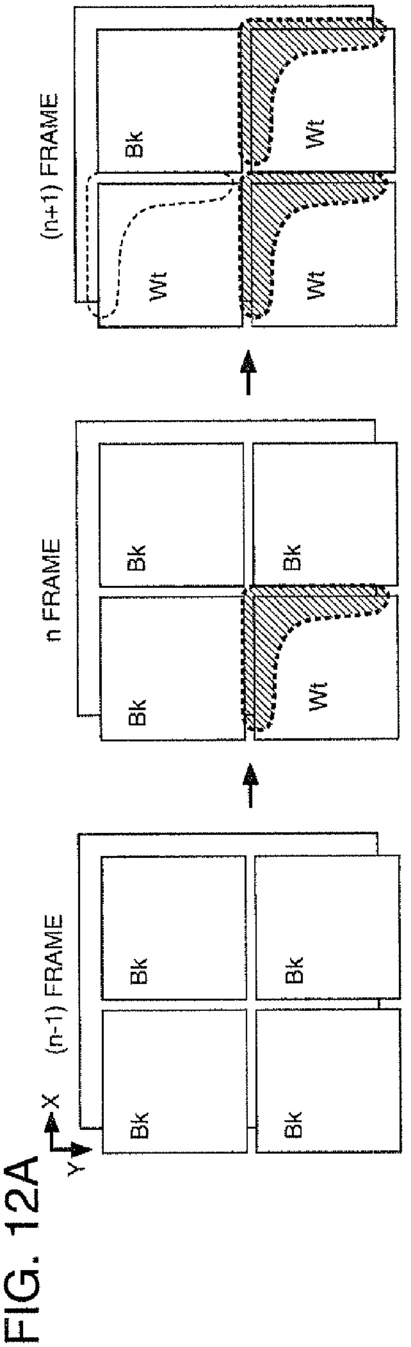
FIGS. 12A and 12B are explanatory diagrams of the reverse tilt generated in the liquid crystal panel.

As shown in FIG. 12A, in the case in which the four pixels of 2×2 are all, for example, the black pixels (Bk) the (n−1)-th frame, when the lower left pixel alone changes to the white pixel (Wt) in the n-th frame, the reverse tilt occurs in the white pixel as already explained with reference to FIGS. 9A through 9C. The reverse tilt in this case occurs on the upper side and the right side of the white pixel as shown in the n-th frame of FIG. 9C or FIG. 12A. This is because in the lower left white pixel there are generated strong lateral electrical fields with the black pixel located on the upper side, the black pixel located on the upper right side, and the black pixel located on the right side, respectively.

In the subsequent (n+1)-th frame, when the lower right pixel (having the white pixel bordering on the right side) changes to the white pixel due to the movement of the black pattern, the reverse tilt occurs similarly in the lower right pixel on the upper side and the right side thereof, and the reverse tilt area is linked with the reverse tilt area having already occurred on the upper side of the lower left pixel. Thus, the reverse tilt generation area continues over a plurality of pixels, and as a result, it becomes visually conspicuous.

Figure 12B:
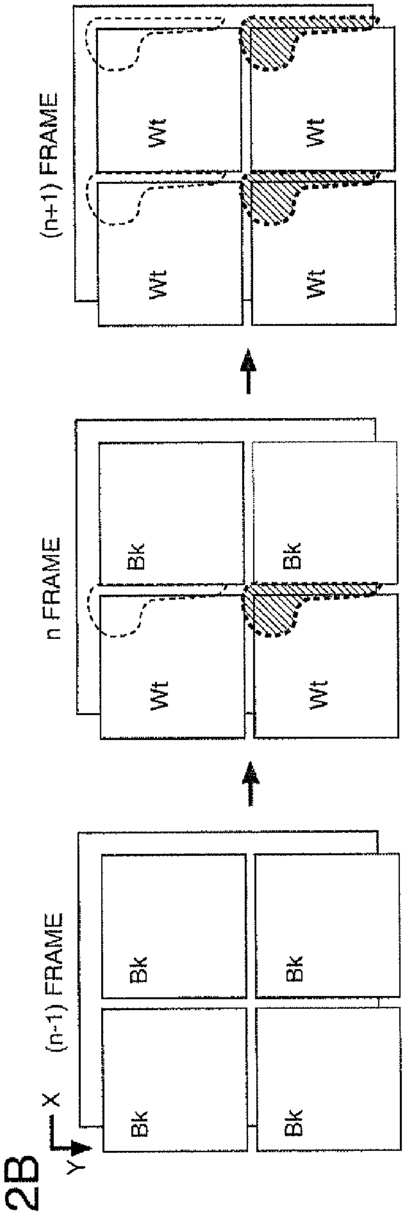

Then, the case in which the lower left pixel and the upper left pixel of the four pixels of 2×2 change to the white pixels in the n-th frame, namely the case in which the left half column thereof changes to the white pixels as shown in FIG. 12B will be considered. In this case, in the lower left pixel (the observed pixel) to be changed to the white pixel in the n-th frame, the reverse tilt occurs on the upper right corner and the right side thereof, but hardly occurs on the upper side as shown in n-th frame of FIG. 12B. This is because in the observed pixel there are generated the strong lateral electrical fields with the black pixel located on the upper right side and the black pixel located on the right side, but the lateral electrical field is hardly generated with the bright pixel located on the upper side.

Further, although the reverse tilt occurs on the right side of the observed pixel, on the ground that no lateral electrical field is generated on the upper side, the width in the horizontal direction of the reverse tilt generation area is also reduced compared to the case shown in FIG. 12A in which the lateral electrical field occurs on two sides (the upper side and the right side).

Even if in the (n+1)-th frame the lower right pixel and the upper right pixel of the four pixels of 2×2 become the white pixels due to the rightward movement of the black pattern, the reverse tilt generation area is not linked, but remains discrete, and therefore never becomes visually conspicuous because the reverse tilt extending in the horizontal direction (the X direction) does not exist on the upper side.

It should be noted that although the case in which the lower left pixel and the upper left pixel of the four pixels of 2×2 are changed to the bright pixels in the n-th frame is considered here, the same can be applied also to the case in which the lower left pixel and the lower right pixel change to the bright pixels, namely the case in which the lower half row changes to the white pixels.

As described above, even in the case in which the white (bright) pixel fulfilling the positional relationship of the requirement 1 and the requirement 2 in the n-th frame fulfills the requirement 3, although the reverse tilt occurs, the influence thereof is visually inconspicuous in some cases. In view of this point, the requirement 2 described above will be amended as the requirement 2a below.

That is, the clause of the requirement 2 is replaced with the following clause.

"2a. if the bright pixel (with a high applied voltage) is surrounded by the dark pixels (with a low applied voltage) located on the upper side, the upper right side, and the right side thereof, namely if the bright pixel is surrounded by the risk boundary on the upper side and the right side in the n-th frame; and"

Therefore, it results that the reverse tilt can be prevented from occurring by the following measures taking the expression using the risk boundary when setting back the time reference as much as one frame while taking the requirements 1, 2a, and 3 into consideration.

That is, in the n-th frame, in the boundary on which the dark pixel and the bright pixel border each other, the portion of the boundary having the dark pixel located on the upper side and the bright pixel located on the lower side and the portion thereof having the dark pixel located on the right side and the bright pixel located on the left side are detected as the risk boundary.

Further, it results that by applying the voltage with which the liquid crystal molecules do not become in the unstable state to the liquid crystal element of the dark pixel bordering the pixel having the state changed from the dark pixel to the bright pixel in the n-th frame and surrounded by the risk boundary on two sides (the left side and the lower side) among the dark pixels abutting on the risk boundary, the reverse tilt can be prevented from occurring in the oncoming (n+1)-th frame.

In other words, the invention is to prevent the reverse tilt domain from occurring while considering the state of the previous frame in addition to the risk boundary in the correction of the present frame.

Then, consideration will be given to how the liquid crystal molecules can be prevented from becoming in the unstable state in the dark pixel in the case in which the dark pixel and the bright pixel border each other in the image represented by the video signal Vid-in and the dark pixel is in the positional relationship described above with the bright pixel in the n-th frame. As described above, the case in which the liquid crystal molecules are in the unstable state denotes the case in which the applied voltage to the liquid crystal element is lower than the voltage Vc. Therefore, it results that if the applied voltage to the liquid crystal element designated by the video signal Vid-in is lower than the voltage Vc in the dark pixel fulfilling the positional relationship described above, it is sufficient to forcibly replace the applied voltage with a voltage equal to or higher than the voltage Vc and then apply it thereto.

Then, what value is preferable as the voltage to replace with will be studied. If priority is given to the point that the liquid crystal molecules are set in a more stable state when the applied voltage is replaced with the voltage equal to or higher than the voltage Vc and applied to the liquid crystal element in the case in which the applied voltage designated by the video signal Vid-in is lower than the voltage Vc, or to the point that the reverse tilt domain is more surely prevented from occurring, the higher voltage is more preferable. However, in the normally black mode, the transmittance rises as the applied voltage to the liquid crystal element is raised. Since the grayscale level designated by the original video signal Vid-in corresponds to the dark pixel, namely a rather low transmittance, raising the replacement voltage leads to displaying a bright pixel not based on the video signal Vid-in.

In contrast, if priority is given to the point that when applying the voltage replaced so as to be equal to or higher than the voltage Vc to the liquid crystal element, the variation in the transmittance due to the replacement is prevented from being perceived, it results that the voltage Vc, the lower limit, is preferable.

As described above, what value should be taken as the replacement voltage should be determined based on what has a higher priority. Although in the present embodiment, the voltage Vc is adopted as the replacement voltage giving priority to the point that the variation in the transmittance due to the replacement is prevented from being perceived, if priority is given to the other point described above, it is not necessary to adopt the voltage Vc.

It should be noted that the liquid crystal molecules in the VA type take the orientation most approximate to the direction perpendicular to the surface of the substrate when the applied voltage to the liquid crystal element is zero. The voltage Vc is in a range of the voltage of providing the liquid crystal molecules with the initial tilt angle, and the liquid crystal molecules start to tilt in response to application of this voltage.

The voltage Vc with which the liquid crystal molecules become in the stable state is not simply be determined because the voltage Vc is generally correlated with various parameters in the liquid crystal panel. However, in the liquid crystal panel having the gap between the pixel electrodes 118 narrower than the gap (cell gap) between the pixel electrode 118 and the common electrode 108 as is the case of the present embodiment, the voltage Vc is about 1.5 volt.

Therefore, since the 1.5 volt is the lower limit of the replacement voltage, it results that the voltage equal to or higher than this voltage is sufficient. Conversely, if the applied voltage to the liquid crystal element is lower than 1.5 volt, the liquid crystal molecules become in the unstable state.

The video processing circuit 30 shown in FIG. 1 is the circuit for processing the video signal Vid-in based on such a thought as described above to thereby prevent the reverse tilt domain from occurring in the liquid crystal panel 100. Therefore, the video processing circuit 30 will hereinafter be explained in detail.

Figure 3:
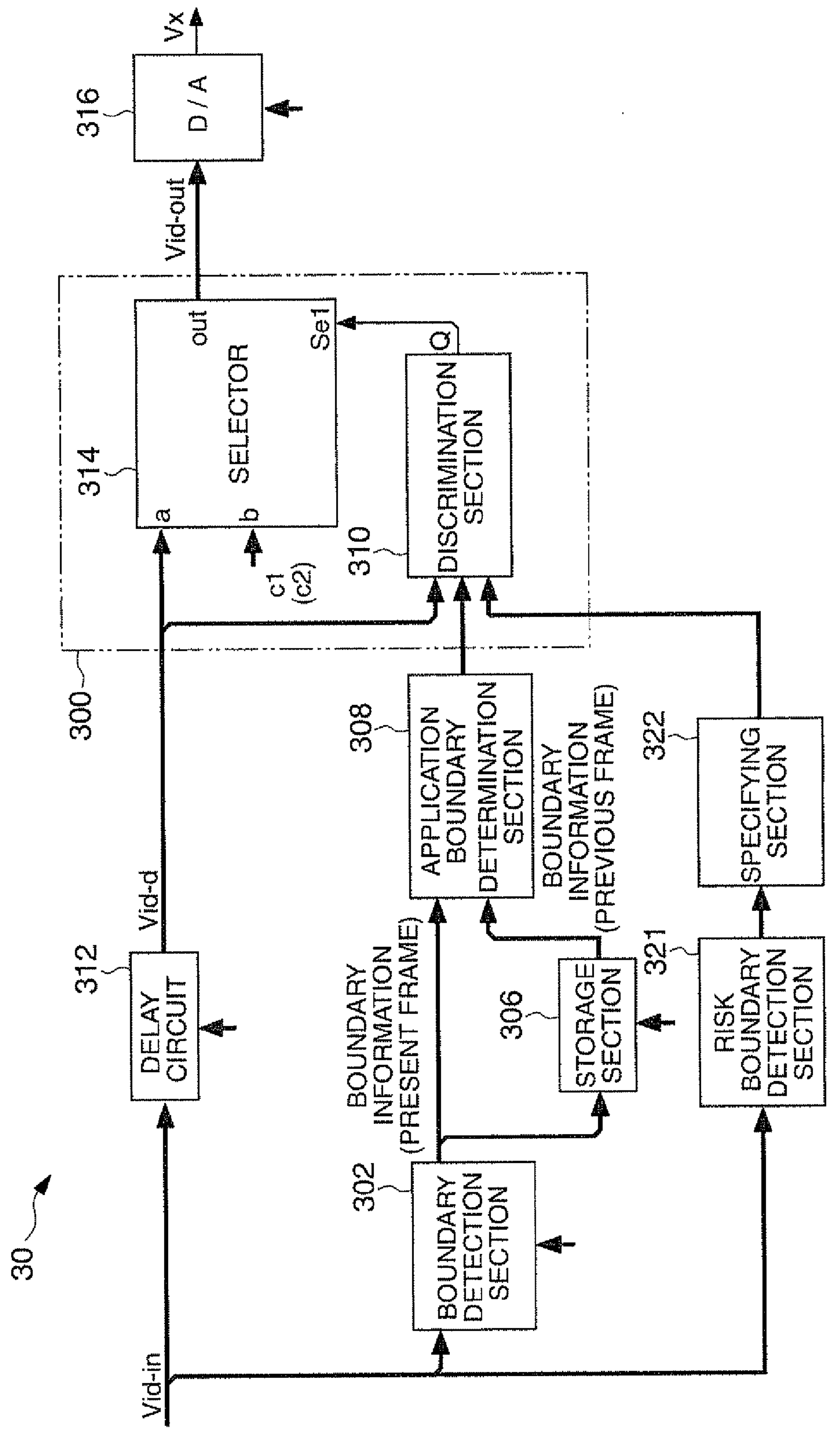
FIG. 3 is a diagram showing a configuration of the video processing circuit.

FIG. 3 is a block diagram showing a configuration of the video processing circuit 30.

As shown in this drawing, the video processing circuit 30 has a correction section 300, a boundary detection section 302, a storage section 306, an application boundary determination section 308, a risk boundary detection section 321, a specifying section 322, a delay circuit 312, and a D/A converter 316.

Among these constituents, the delay circuit 312 is for accumulating the video signal Vid-in supplied from the higher-level device, and then retrieving it after a predetermined time elapses to output it as a video signal Vid-d, and is mainly composed of a first-in first-out (FIFO) memory and a multi-stage latch circuit. It should be noted that the accumulation and the retrieval in the delay circuit 312 are controlled by the scan control circuit 20.

In the present embodiment, the boundary detection section 302 analyzes the image represented by the video signal Vid-in to detect the boundary on which a pixel in a grayscale range "a" and a pixel in a grayscale range "b" border each other, and then outputs boundary information representing the boundary.

It should be noted that the boundary here strictly denotes the portion where the pixel in the grayscale range "a" and the pixel in the grayscale range "b" border each other. Therefore, the portion where the pixel in the grayscale range "a" and the pixel in the grayscale range "c" border each other, or the portion where the pixel in the grayscale range "b" and the pixel in the grayscale range "c" border each other, for example, is not treated as the boundary. Further, since the video signal Vid-in (Vid-d) represents the image to be displayed, the frame of the image represented by the video signal Vid-in (Vid-d) is also referred to as a present frame in some cases.

Incidentally, the storage section 306 is for storing the information of the boundary output by the boundary detection section 302, and then outputting the information of the boundary thus stored after one frame elapses. Therefore, it is arranged that the storage section 306 outputs the information of the boundary in the frame previous to the present frame, the information of the boundary of which is output from the boundary detection section 302. It should be noted that the storage and the output of information in the storage section 306 are controlled by the scan control circuit 20.

The application boundary determination section 308 is for determining what is obtained by excluding portions of the boundary of the present frame, which is detected by the boundary detection section 302, identical to the boundary of the previous frame stored in the storage section 306 from the boundary of the present frame as an application boundary.

The risk boundary detection section 321 analyzes the image represented by the video signal Vid-in to thereby perform first detection and second detection. In detail, the risk boundary detection section 321 respectively performs the first detection for detecting the boundary on which the pixel in the grayscale range "a" and the pixel in the grayscale range "b" border each other in a vertical direction or a horizontal direction, and the second detection for detecting the portion of the boundary thus detected having the dark pixel located on the upper side and the bright pixel located on the lower side, and the portion thereof having the dark pixel located on the right side and the bright pixel located on the left side as the risk boundary.

The specifying section 322 specifies the dark pixel surrounded by the risk boundary on two sides, namely the left side and the lower side, out of the dark pixels abutting on the risk boundary output by the risk boundary detection section 321.

The correction section 300 has a discrimination section 310 and a selector 314.

Among these constituents, the discrimination section 310 discriminates whether or not the grayscale level of the pixel represented by the video signal Vid-d delayed by the delay circuit 312 belongs to the grayscale range "a," the pixel abuts on the application boundary determined by the application boundary determination section 308, and the pixel is specified by the specifying section 322.

Here, the discrimination section 310 sets the value of the flag Q to be supplied to the selector 314 to "1" if the discrimination result is "Yes," or sets the value of the flag Q to "0" if the discrimination result is "No."

It should be noted that since the risk boundary detection section 321 cannot detect the boundary throughout the image to be displayed in the vertical or horizontal direction unless the video signal corresponding to a plurality of rows has been stored, the delay circuit 302 is provided for the purpose of adjusting the supply timing of the video signal Vid-in from the higher-level device. Therefore, since the timing of the video signal Vid-in supplied from the higher-level device and the timing of the video signal Vid-d supplied from the delay circuit 302 are different from each other, the horizontal scanning period or the like is not identical between the both signals in a strict sense. However, the explanation will hereinafter be presented with no particular discrimination.

Further, the accumulation of the video signal Vid-in or the like in the risk boundary detection section 321 is controlled by the scan control circuit 20.

The selector 312 is for replacing the video signal Vid-d with a video signal with the grayscale level "c1" and then outputting it as a video signal Vid-out if the grayscale level designated by the video signal Vid-d designates a level darker than "c1" in the case in which the value of the flag Q supplied from the discrimination section 314 is "1."

It should be noted that if the value of the flag Q is "0," the selector 312 directly outputs the video signal Vid-d as the video signal Vid-out without replacing grayscale level.

The D/A converter 316 converts the video signal Vid-out as a digital data into a data signal Vx as an analog signal. It should be noted that as described above since the plane reverse type is adopted in the present embodiment, the polarity of the data signal Vx is switched every time rewriting of one exposure is performed on the liquid crystal panel 100.

According to the video processing circuit 30 described above, if the pixel represented by the video signal Vid-d has the grayscale level darker than "c1," abuts on the application boundary, and is the dark pixel surrounded by the risk boundary on the two sides, the value of the flag is set to "1," the grayscale level of the dark pixel represented by the video signal Vid-d is replaced with "c1," and then the video signal Vid-d is output as the video signal Vid-out.

In contrast, if the pixel represented by the video signal Vid-d does not abut on the application boundary, if it is not the dark pixel abutting on the risk boundary, if it is the dark pixel abutting on the risk boundary with only one side even though it does abut on the risk boundary, or if a bright grayscale level equal to or higher than "c1" is designated, the value of the flag Q is set to "0," and therefore, the video signal Vid-d is output as the video signal Vid-out without correcting the grayscale level.

Then, the display operation of the liquid crystal display device 1 will be explained. The video signal Vid-in is supplied from the higher-level device throughout the frame in the pixel order of (1st row, 1st column) through (1st row, n-th column), (2nd row, 1st column) through (2nd row, n-th column), (3rd row, 1st column) through (3rd row, n-th column), . . . , (m-th row, 1st column) through (m-th row, n-th column). The video processing circuit 30 performs, for example, the delay process and the replacement process on the video signal Vid-in, and outputs the result as the video signal Vid-out.

Figure 5B:
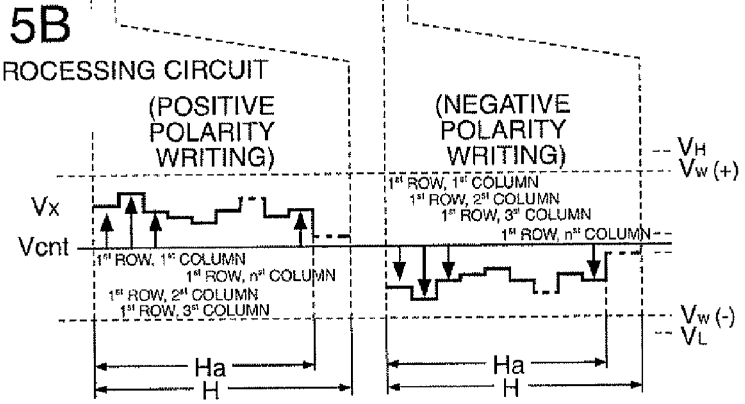

Here, when focusing attention on the horizontal effective scanning period (Ha) in which the video signal Vid-out of the (1st row, 1st column) through (1st row, n-th column) is output, the video signal Vid-out is converted by the D/A converter 316 into the data signal Vx having either one of positive or negative polarities (e.g., the positive polarity here) as shown in FIG. 5B. The data signal Vx is sampled by the data line drive circuit 140 on the data lines 114 corresponding to the 1st through n-th columns as the data signals X1 through Xn.

Incidentally, in the horizontal scanning period in which the video signal Vid-out corresponding to the (1st row, 1st column) through (1st row, n-th column) is output, the scan control circuit 20 controls the scan line drive circuit 130 to set only the scan signal Y1 to the H level. If the scan signal Y1 is in the H level, the TFTs 116 on the 1st row become in the ON state, and therefore, the data signals sampled on the data lines 114 are applied to the pixel electrodes 118 via the TFTs 116 in the ON state, respectively. Thus, the positive voltages corresponding to the grayscale levels designated by the video signal Vid-out are written into the liquid crystal elements of the (1st row, 1st column) through (1st row, n-th column), respectively.

Subsequently, the video signal Vid-in corresponding to the (2nd row, 1st column) through (2nd row, n-th column) is similarly processed by the video processing circuit 30 and then output as the video signal Vid-out, and at the same time, converted by the D/A converter 316 into the positive data signal to be sampled by the data line drive circuit 140 on the data lines 114 corresponding respectively to the 1st through n-th columns.

In the horizontal scanning period in which the video signal Vid-out corresponding to the (2nd row, 1st column) through (2nd row, n-th column) is output, since the scan line drive circuit 130 sets only the scan signal Y2 to the H level, the data signals sampled on the data lines 114 are applied to the pixel electrodes 118 via the TFTs 116 in the 2nd row in the ON state, respectively. Thus, the positive voltages corresponding to the grayscale levels designated by the video signal Vid-out are written into the liquid crystal elements of the (2nd row, 1st column) through (2nd row, n-th column), respectively.

Subsequently, substantially the same writing operation is performed on each of the 3rd, 4th, . . . , and m-th rows, and thus the voltages corresponding to the respective grayscale levels designated by the video signal Vid-out are written into the respective liquid crystal elements. Thus, it results that the transmissive image defined by the video signal Vid-in is formed.

In the subsequent frame, substantially the same writing operation is performed except the fact that the video signal Vid-out is converted into the negative data signal due to the polarity reversal of the data signal.

FIG. 5B is a voltage waveform chart showing an example of the data signal Vx in the case in which the video signal Vid-out corresponding to the (1st row, 1st column) through (1st row, n-th column) is output throughout the horizontal scanning period (H) from the video processing circuit 30. Since the normally black mode is adopted in the present embodiment, the data signal Vx takes a higher voltage value (indicated by ↑ in the drawing) with respect to the amplitude center voltage Vcnt as the grayscale level processed by the video processing circuit 30 becomes brighter in the case of the positive polarity, while the data signal Vx takes a lower voltage value (indicated by ↓ in the drawing) with respect to the amplitude center voltage Vcnt as the grayscale level becomes brighter in the case of the negative polarity.

In detail, the voltage of the data signal Vx becomes the voltage shifted from the reference voltage Vcnt as much as an amount corresponding to the grayscale in a range from the voltage Vw (+) corresponding to white to the voltage Vb (+) corresponding to black in the case of the positive polarity, or in a range from the voltage Vw (−) corresponding to white to the voltage Vb (−) corresponding to black in the case of the negative polarity.

The voltage Vw (+) and the voltage Vw (−) are in a symmetrical relationship with each other about the voltage Vcnt. The voltage Vb (+) and the voltage Vb (−) are also in a symmetrical relationship with each other about the voltage Vcnt.

It should be noted that FIG. 5B is for showing the voltage waveform of the data signal Vx, which is different from the voltage (the electrical potential difference between the pixel electrode 118 and the common electrode 108) to be applied to the liquid crystal element 120. Further, the vertical scale of the voltage of the data signal in FIG. 5B is expanded compared to the voltage waveforms of the scan signals in FIG. 5A.

Subsequently, a specific example of a correction process by the video processing circuit 30 shown in FIG. 3 will be explained taking the case as an example, in which (a part of) the image represented by the video signal Vid-in is an image for displaying a pattern of the black (dark) pixels having the liquid crystal molecules in the unstable state on the background of the white (bright) pixels in the grayscale range "b" as shown in the part 1 of FIG. 13.

Figure 13:
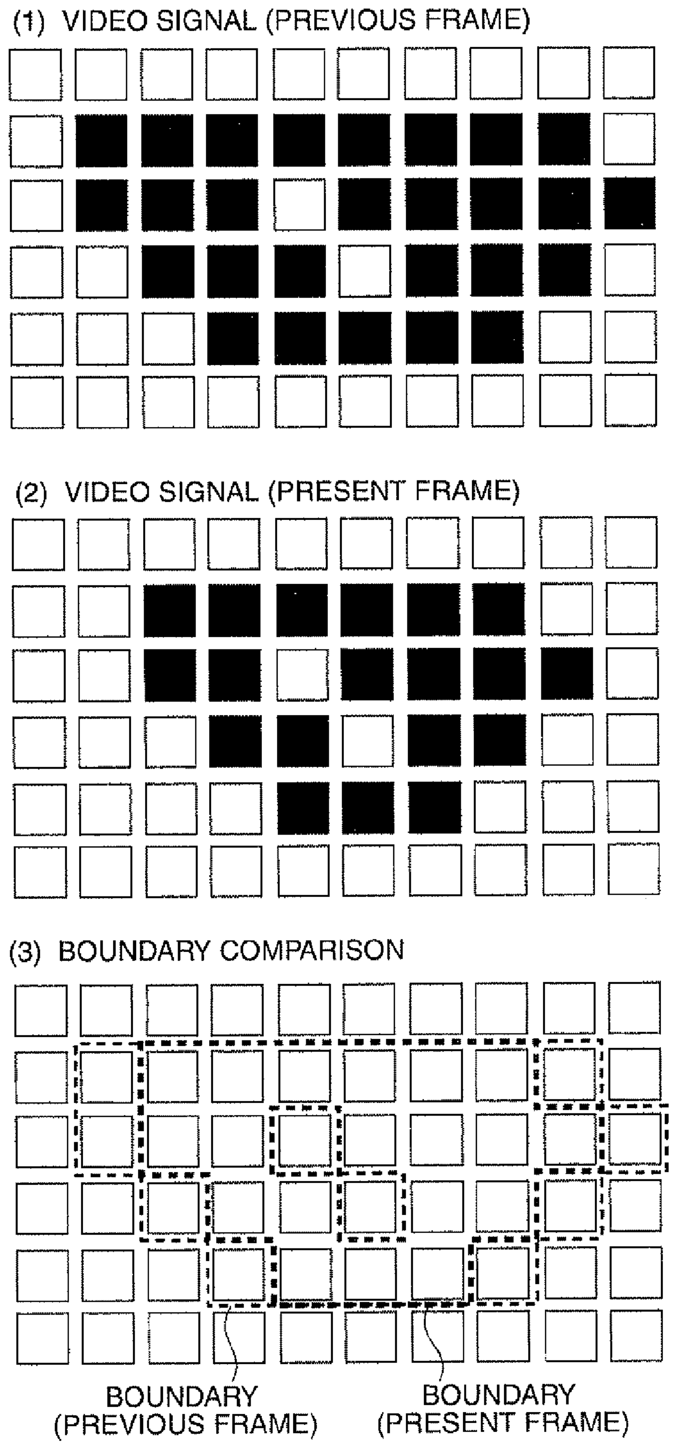
FIG. 13 is a diagram showing a process in the video processing circuit.

In the case in which the image represented by the video signal Vid-in of the present frame is as shown in the part 2 of FIG. 13, for example, and the image represented by the video signal of the previous frame is, for example, as shown in the part 1 of FIG. 13, the boundary of the image of the previous frame detected by the boundary detection section 302 and then stored in the storage section 306 and the boundary of the image of the present frame detected by the boundary detection section 302 are as shown in the part 3 of FIG. 13. Therefore, the application boundary determined by the application boundary determination section 308 becomes as shown in the part 4 of FIG. 14.

Figure 14:
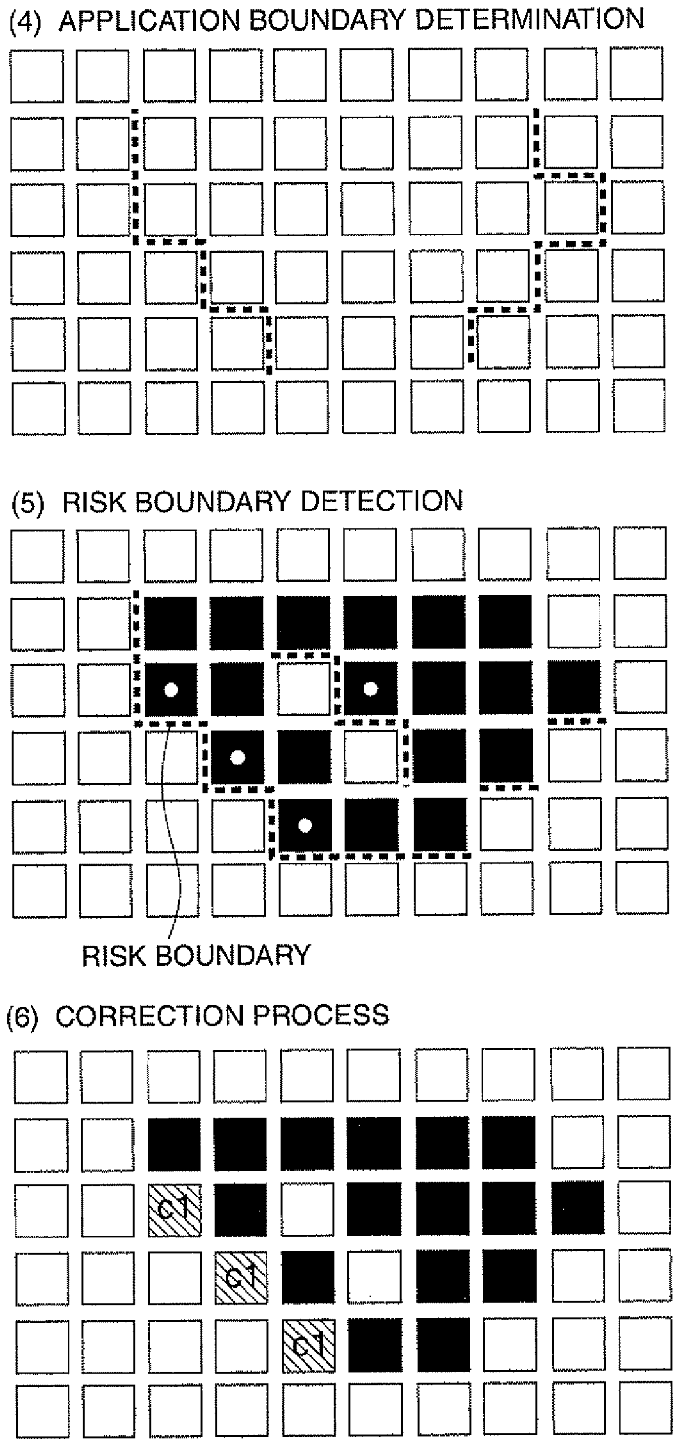
FIG. 14 is a diagram showing the process in the video processing circuit.

Further, in the case in which the image of the present frame represented by the video signal Vid-in is as shown in the part 2 of FIG. 13, the risk boundary detected by the risk boundary detection section 321 becomes as shown in the part 5 of FIG. 14.

In other words, in the boundary (not shown) on which the dark pixel and the bright pixel border each other, the portion having the dark pixel located on the upper side of the boundary and the bright pixel located on the lower side of the boundary, and the portion having the dark pixel located on the right side of the boundary and the bright pixel located on the left side of the boundary become the risk boundary.

The specifying section 322 specifies the dark pixel surrounded by the risk boundary on two sides (the left side and the lower side) out of the dark pixels abutting on the risk boundary. In the example shown in the part 2 of FIG. 13, the dark pixels surrounded on two sides are three pixels provided with white circles in the part 5 of FIG. 14.

Regarding the dark (black) pixels having the grayscale level belonging to the grayscale range "a," abutting on the application boundary shown in the part 4 of FIG. 14, and surrounded by the risk boundary on two sides among the dark pixels provided with the white circles in the part 5 of FIG. 14, since the discrimination result in the discrimination section 310 is set to "Yes," and the grayscale level is replaced with the grayscale level "c1" by the selector 312, the image thus processed becomes as shown in the part 6 of FIG. 14.

It should be noted that even in the case in which the dark pixel has the grayscale level belonging to the grayscale range "a," and abuts on the risk boundary, if the pixel does not abut on the application boundary (the pixel located at the third row from the top and the fifth column from the right in the part 5 of FIG. 14), the discrimination result in the discrimination section 310 becomes "No," and the grayscale level is not replaced by the selector 312.

Figure 6B:
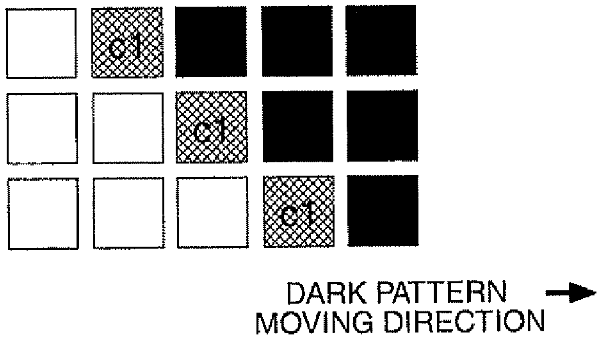

Therefore, even if the image represented by the video signal Vid-in includes the part changing from the black pixel to the white pixel due to the left side portion of the pattern composed of the black pixels moving one pixel rightward on the background of the white pixels as shown in the part 1 and the part 2 of FIG. 13, for example, in the liquid crystal panel 100, the black pixel does not change from the state in which the liquid crystal molecules are in the unstable state directly to the white pixel, but changes to the white pixel after once passing through the state in which the liquid crystal molecules are forcibly set to the stable state due to the application of the voltage Vc corresponding to the grayscale level "c1" as shown in FIG. 6B. Therefore, the reverse tilt domain can be prevented from occurring. It should be noted that although not particularly illustrated, the same can be applied to the case in which the black pattern moves in the upper right direction or the upward direction.

Further, regarding the black pixel abutting on the risk boundary but not abutting on the pixel with the state having changed from the previous frame, namely the black pixel abutting on the risk boundary but not abutting on the application boundary, since the grayscale level is not replaced by the selector 312 with the grayscale level "c1," the portion where the display not based on the video signal Vid-in occurs can be reduced compared to the configuration of replacing the dark pixels abutting on the risk boundary without exception.

Further, it becomes possible to prevent the area where the reverse tilt easily occurs from being continuous due to the movement of the black pixel.

Further, since in the present embodiment the video signal equal to or higher than a set value is not clipped without exception, the harmful influence exerted on the contrast ratio by setting unavailable voltage range is eliminated.

Further, since there is no need to make a change to the structure of the liquid crystal panel 100, degradation in aperture ratio is never caused, and it is also possible to apply the invention to the liquid crystal panels having already manufactured without devising the structure.

Another Example of Tilt Azimuth Angle

In the embodiment described above, the case in which the tilt azimuth angle θb is 45 degrees in the normally black mode of the VA type is explained. Then, an example having the tilt azimuth angle θb other than 45 degrees will hereinafter be explained.

Tilt Azimuth Angle: 0 Degree

Figure 15A:
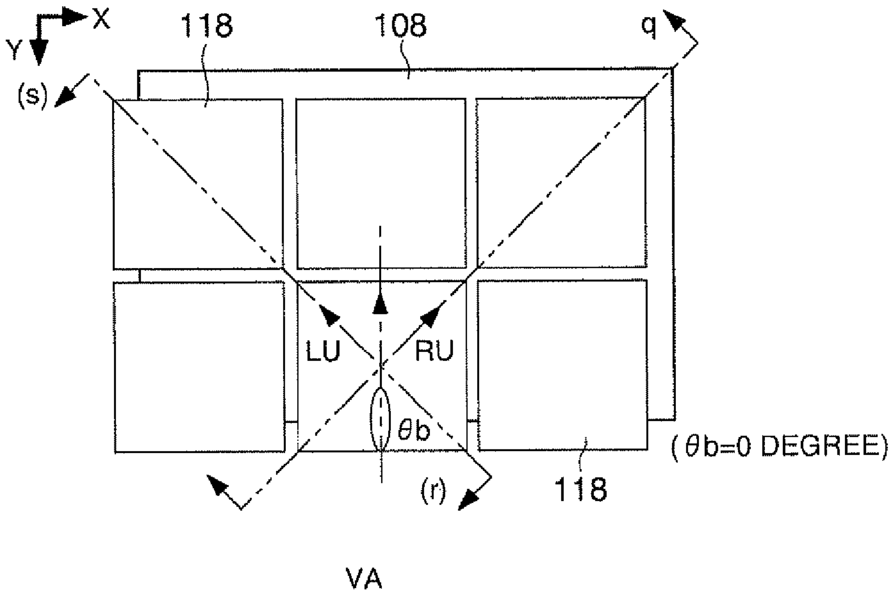
FIGS. 15A through 15C are explanatory diagrams of processed orientation in the case of setting a tilt azimuth angle to 0 degree.
Figure 15B:
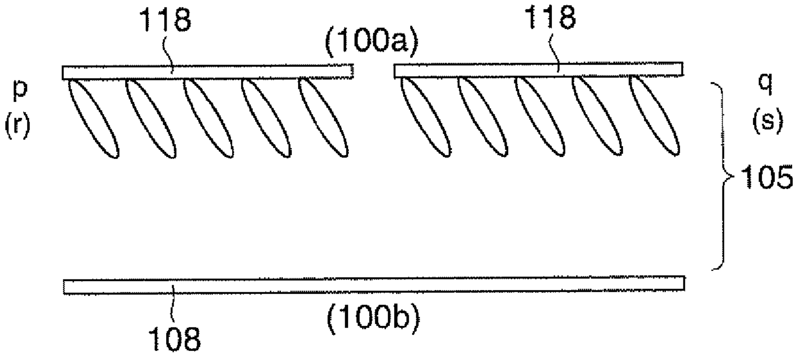
Figure 15C:
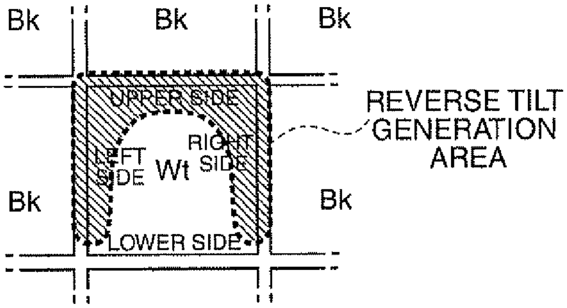

Firstly, the case in which the tilt azimuth angle θb is equal to 0 degree as shown in FIG. 15A will be explained. In this case, when the liquid crystal molecules are in the unstable state in the observed pixel and all of the peripheral pixels, and the observed pixel alone changes to the bright pixel (Wt), the reverse tilt occurs in the observed pixel on the upper side, the right side, and the left side of the bright pixel as shown in FIG. 15C.

Since the upper side of the bright pixel is the downstream side of the tilt azimuth direction in the liquid crystal molecules, the liquid crystal molecules located on the side bordering the upper black pixel become in the reverse tilt state due to the lateral electrical field caused with the upper dark pixel temporally prior to other liquid crystal molecules biased to tilt with the vertical electrical field.

On the upper right corner of the bright pixel, the lateral electrical field in an RU direction is generated in FIG. 15A due to the adjacency with the upper right black pixel. In the case in which the tilt azimuth angle θb is 0 degree, when cutting the liquid crystal panel 100 by the vertical plane including the line p-q in FIG. 15A, the state immediately before the liquid crystal molecules vary is similar to the case of FIG. 7A as shown in FIG. 15B. Therefore, it results that the reverse tilt domain occurs also on the upper right corner of the bright pixel.

On the right side of the bright pixel, the lateral electrical field in a horizontal direction is generated in FIG. 15A due to the adjacency with the black pixel located on the right side. Although the horizontal direction is perpendicular to the direction in which the liquid crystal molecules are biased to tilt in accordance with the applied voltage, the liquid crystal molecules become in the reverse tilt state temporally in advance thereof due to the lateral electrical field exert a harmful influence on the motion of other liquid crystal molecules biased to tilt with the vertical electrical field. Therefore, the reverse tilt domain occurs also on the right side of the bright pixel.

On the upper left corner of the bright pixel, the lateral electrical field in an LU direction is generated in FIG. 15A due to the adjacency with the upper left black pixel. Therefore, when cutting the liquid crystal panel 100 by the vertical plane including the line r-s in FIG. 15A, the state immediately before the liquid crystal molecules vary is similar to the case of FIG. 7A as shown in FIG. 15B. Therefore, it results that the reverse tilt domain occurs also on the upper left corner of the bright pixel similarly to the case of the right corner.

Further, on the left side of the bright pixel, the lateral electrical field in a horizontal direction (X direction) is generated due to the adjacency with the black pixel located on the left side. Therefore, the reverse tilt domain occurs also on the left side of the bright pixel similarly to the case of the right side thereof.

It should be noted that since the lower side of the bright pixel is the upstream side of the tilt azimuth direction in the liquid crystal molecules, the liquid crystal molecules located on the side bordering the black pixel on the lower side do not hinder the motion of other liquid crystal molecules biased to tilt with the vertical electrical field. Therefore, the reverse tilt domain hardly occurs on the lower side of the bright pixel.

Therefore, in the case of considering that the tilt azimuth angle θb is equal to 0 degree in the normally black mode of the VA type, it is conceivable that the reverse tilt domain can occur in the bright pixel if the dark pixel is located on the upper side, the right side, or the left side of the bright pixel in the n-th frame.

Therefore, consideration will now be given from the viewpoint of reducing the pixels constituting the display departure.

Figure 16:
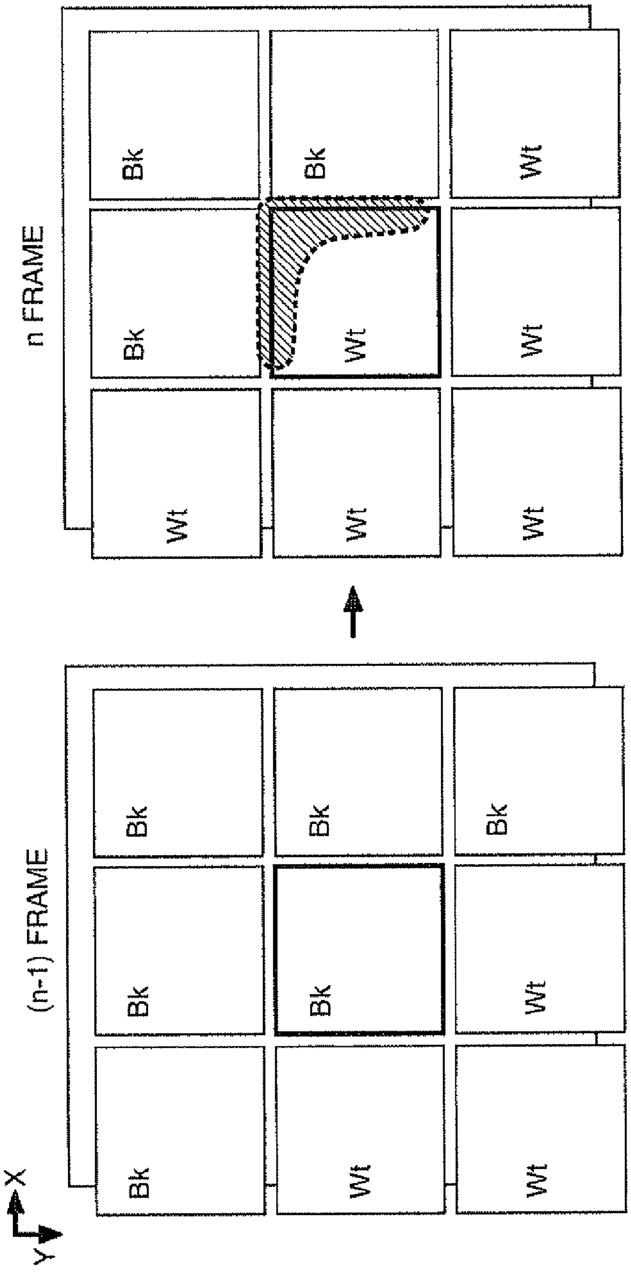
FIG. 16 is an explanatory diagram of the reverse tilt generated at the tilt azimuth angle of 0 degree.

Firstly, the case in which 9 pixels of 3×3 change due to the movement of a black pattern as shown in FIG. 16 is assumed, and at the same time, attention is focused on the pixel at the center thereof. In this example, the observed pixel changes from the state in which the liquid crystal molecules are unstable in the (n−1)-th frame to the bright pixel (Wt) in the n-th frame, and at the same time, the dark pixels (Bk) border on the upper side, the upper right side, and the right side thereof. In this case, although the reverse tilt domain occurs on the upper side and the right side of the observed pixel due to the lateral electrical field in the n-th frame, since the bright pixel is located on the left side, and no lateral electrical field is generated, the reverse tilt domain does not occur on the left side.

Therefore, in the example shown in FIG. 16, if the black pattern in the n-th frame moves one pixel upward in the subsequent frame, the reverse tilt generation area is linked with the reverse tilt generation area extending on the right side in a vertical direction, and if the black pattern moves one pixel rightward in the subsequent frame, the reverse tilt generation area is linked with the reverse tilt generation area extending on the upper side in a horizontal direction. Thus, the reverse tilt generation area continues over a plurality of pixels, and as a result, it becomes visually conspicuous.

Incidentally, in the example shown in FIG. 16, how the reverse tilt occurs in the observed pixel is similar to the case having the tilt azimuth angle θb of 45 degrees shown in FIG. 12A. Therefore, in the observed pixel, if the upper pixel is the bright pixel, the reverse tilt domain does not occur on the upper side, and similarly, if the right pixel is the bright pixel, the reverse tilt domain does not occur on the right side.

Therefore, even in the case in which the tilt azimuth angle θb is 0 degree, if the pixel to be changed from the state in which the liquid crystal molecules are unstable to the bright pixel (Wt) is not surrounded with two sides (i.e., the upper side and the right side) causing the lateral electrical field but is surrounded with either one of such sides, the reverse tilt generation areas are not linked with each other, but remain discrete, and therefore, it is conceivable there is no chance to be visually conspicuous.

Figure 17:
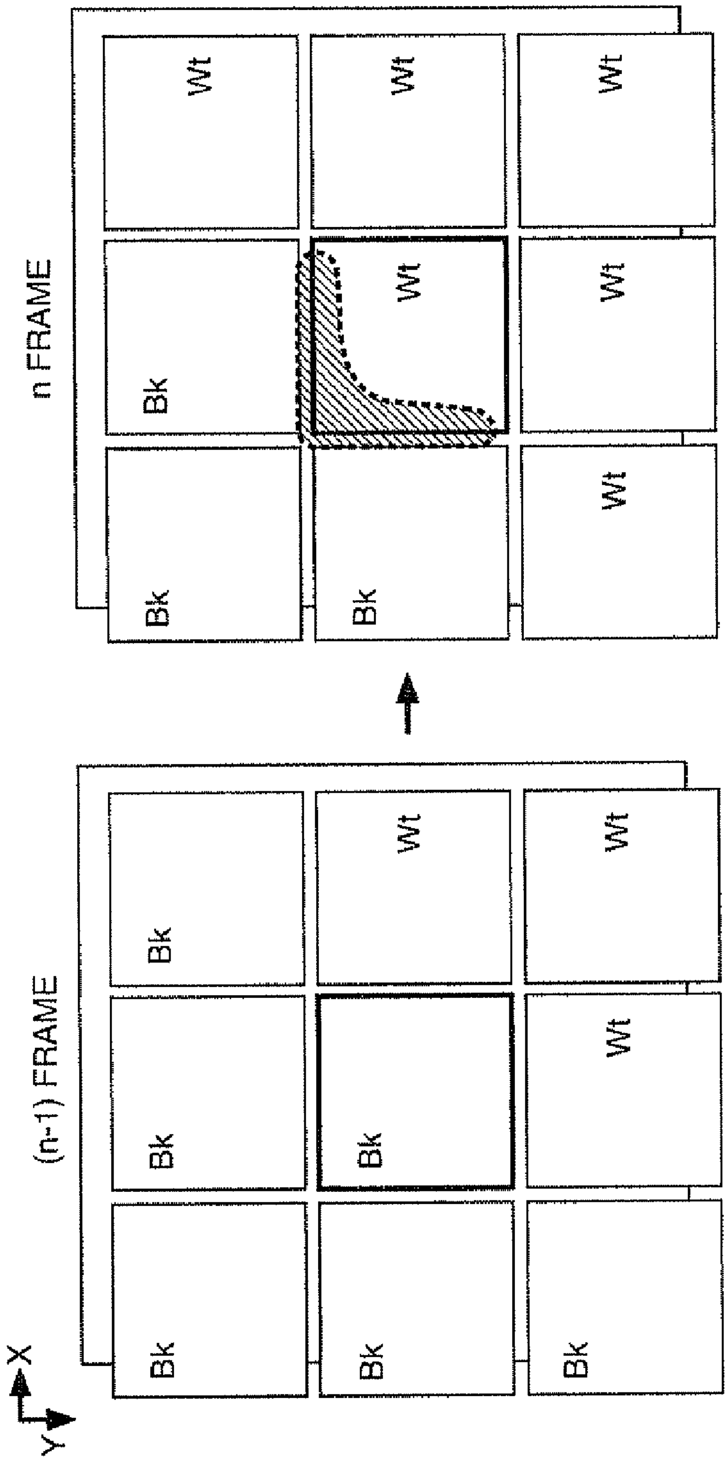
FIG. 17 is an explanatory diagram of the reverse tilt generated at the tilt azimuth angle of 0 degree.

Then, the case in which 9 pixels of 3×3 change due to the movement of a black pattern as shown in FIG. 17 is assumed. In this case, the observed pixel located at the center changes from the state in which the liquid crystal molecules are unstable in the (n−1)-th frame to the bright pixel (Wt) in the n-th frame, and at the same time, the dark pixels (Bk) border on the upper side, the upper left side, and the left side thereof. Therefore, although the reverse tilt domain occurs on the upper side and the left side of the observed pixel due to the lateral electrical field in the n-th frame, the reverse tilt domain does not occur on the right side. Therefore, in the example shown in FIG. 17, if the black pattern in the n-th frame moves one pixel upward in the subsequent frame, the reverse tilt generation area is linked with the reverse tilt generation area extending on the left side in a vertical direction, and if the black pattern moves one pixel leftward in the subsequent frame, the reverse tilt generation area is linked with the reverse tilt generation area extending on the upper side in a horizontal direction. Thus, the reverse tilt generation area continues over a plurality of pixels, and as a result, it becomes visually conspicuous.

Incidentally, similarly in the case shown in FIG. 17, if the observed pixel to be changed from the state in which the liquid crystal molecules are unstable to the bright pixel (Wt) is not surrounded with two sides (i.e., the upper side and the left side) causing the lateral electrical field but is surrounded with either one of such sides, the reverse tilt generation areas are not linked with each other, but remain discrete, and therefore, it is conceivable there is no chance to be visually conspicuous.

Therefore, it results that in the case in which the tilt azimuth angle θb is equal to 0 degree, it is sufficient to perform the following process. That is, it results that it is sufficient that, in the boundary on which the dark pixel and the bright pixel border each other in the image represented by the video signal Vid-in, the portion having the dark pixel located on the upper side and the bright pixel located on the lower side, the portion having the dark pixel located on the right side and the bright pixel located on the left side, and the portion having the dark pixel located on the left side and the bright pixel located on the right side are detected as the risk boundary in the n-th frame, and the process of applying the voltage with which the liquid crystal molecules do not become in the unstable state to the liquid crystal element of the dark pixel surrounded by the risk boundary on at least two sides (i.e., the left side and the lower side, or the right side and the lower side) out of the dark pixels abutting on the risk boundary is performed. This is because the reverse tilt can thus be prevented from occurring in the oncoming (n+1)-th frame.

In order for achieving the above, it is sufficient to perform the following process in the embodiment described above. That is, it is sufficient to adopt the configuration in which the risk boundary detection section 321 detects the portion having the dark pixel located on the left side and the bright pixel located on the right side in the second detection as the risk boundary in addition to the portion having the dark pixel located on the upper side and the bright pixel located on the lower side, and the portion having the dark pixel located on the right side and the bright pixel located on the left side in the boundary detected in the first detection, and further, the specifying section 322 specifies the dark pixel surrounded by the risk boundary on two or more sides out of the dark pixels abutting on the risk boundary.

Figure 18:
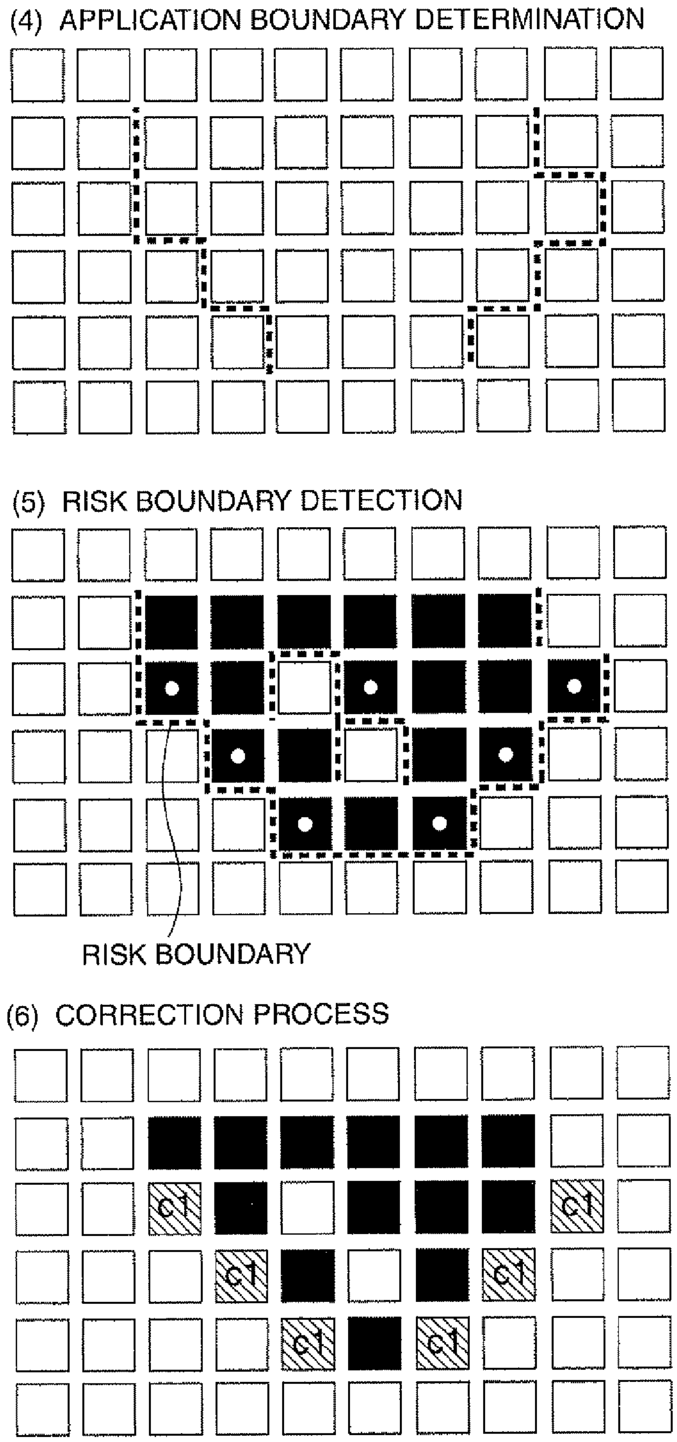
FIG. 18 is a diagram showing a displacement process at the tilt azimuth angle of 0 degree.

FIG. 18 is a diagram showing a specific example of the process performed by the video processing circuit 30 in the case in which the tilt azimuth angle θb is equal to 0 degree in the normally black mode of the VA type on the same pattern as shown in FIG. 13. The correction section 300 determines the application boundary shown in the part 4 of FIG. 18 based on the part 1 and part 2 of FIG. 13, while the risk boundary detection section 321 detects the risk boundary.

The risk boundary to be detected is different from the case shown in FIG. 14 in the point that the portion having the dark pixel located on the left side and the bright pixel located on the right side is also detected as the risk boundary, and the point that the dark pixel surrounded by the risk boundary on the lower side and the right side also becomes the object of the grayscale level replacement.

It should be noted that although the dark pixel surrounded by the risk boundary on three sides, namely the lower side, the left side, and the right side, fails to be included in the example shown in FIG. 18, such a dark pixel also becomes the object of the grayscale level replacement.

In the case in which the tilt azimuth angle θb is equal to 0 degree, if there exists the portion changing from the black pixel to the white pixel in accordance with the black pattern composed of the black pixels moving one pixel in any direction except the downward direction in the image defined by the video signal Vid-in, it becomes possible for the liquid crystal panel 100 to prevent the reverse tilt domain from occurring because the portion is not changed from the state in which the liquid crystal molecules are unstable directly to the white pixel, but is changed to the white pixel after once passing through the state in which the liquid crystal molecules are forced to be stabilized due to the application of the voltage Vc corresponding to the grayscale level of "c1."

It should be noted that as described above, the reverse tilt domain hardly occurs if the black pattern moves one pixel in the downward direction.

Tilt Azimuth Angle: 225 Degrees

Figure 19A:
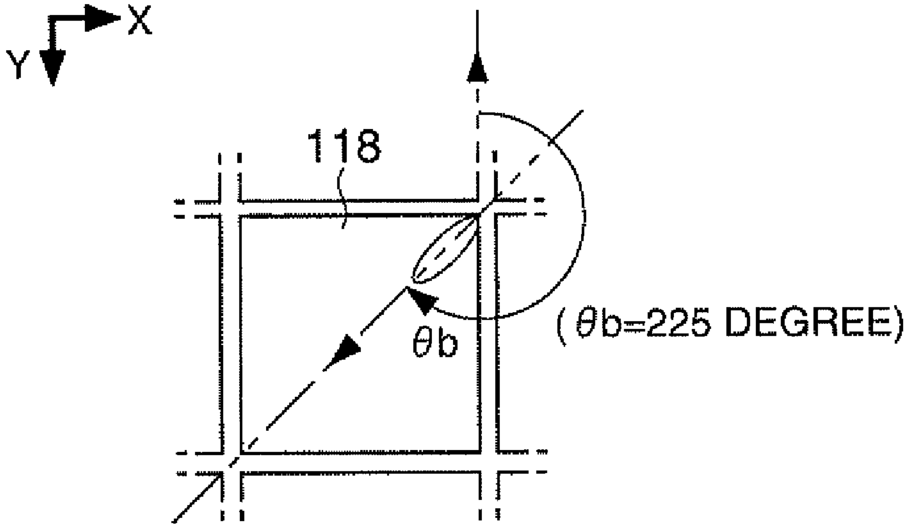
FIGS. 19A and 19B are explanatory diagrams of processed orientation in the case of setting the tilt azimuth angle to 225 degrees.
Figure 19B:
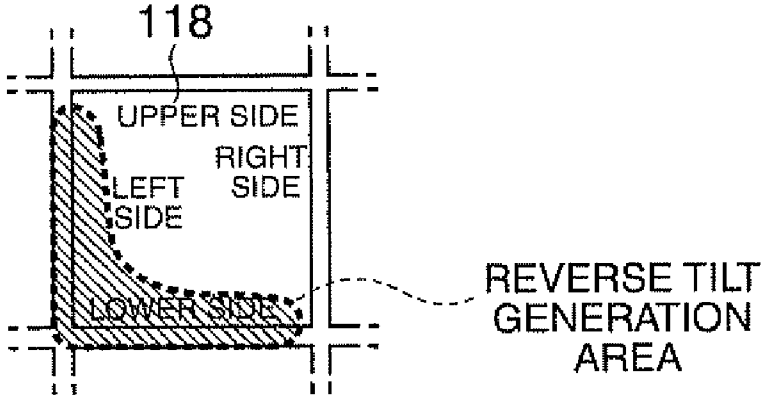

Then, the case in which the tilt azimuth angle θb is equal to 225 degree as shown in FIG. 19A will be explained. It should be noted that since this example is equivalent to the case of rotating the example of the case in which the tilt azimuth angle θb is equal to 45 degrees shown in FIGS. 9A through 9C as much as 180 degrees, the generation area of the reverse tilt also has the relationship of being flipped vertically and horizontally about the center of the pixel as shown in FIG. 19B.

Therefore, it results that in the case in which the tilt azimuth angle θb is equal to 225 degrees, it is sufficient to perform the following process. That is, it results that it is sufficient that, in the boundary on which the dark pixel and the bright pixel border each other in the image represented by the video signal Vid-in, the portion having the dark pixel located on the lower side and the bright pixel located on the upper side, and the portion having the dark pixel located on the left side and the bright pixel located on the right side are detected as the risk boundary in the n-th frame, and the process of applying the voltage with which the liquid crystal molecules do not become in the unstable state to the liquid crystal element of the dark pixel surrounded by the risk boundary on two sides (i.e., the upper side and the right side) out of the dark pixels abutting on the risk boundary is performed. This is because the reverse tilt can thus be prevented from occurring in the oncoming (n+1)-th frame.

In order for achieving the above, it is sufficient to perform the following process in the embodiment described above. That is, it is sufficient to adopt the configuration in which the risk boundary detection section 321 detects the portion having the dark pixel located on the lower side and the bright pixel located on the upper side, and the portion having the dark pixel located on the left side and the bright pixel located on the right side in the second detection as the risk boundary in the boundary detected in the first detection, and further, the specifying section 322 specifies the dark pixel surrounded by the risk boundary on the two sides out of the dark pixels abutting on the risk boundary.

Figure 20:
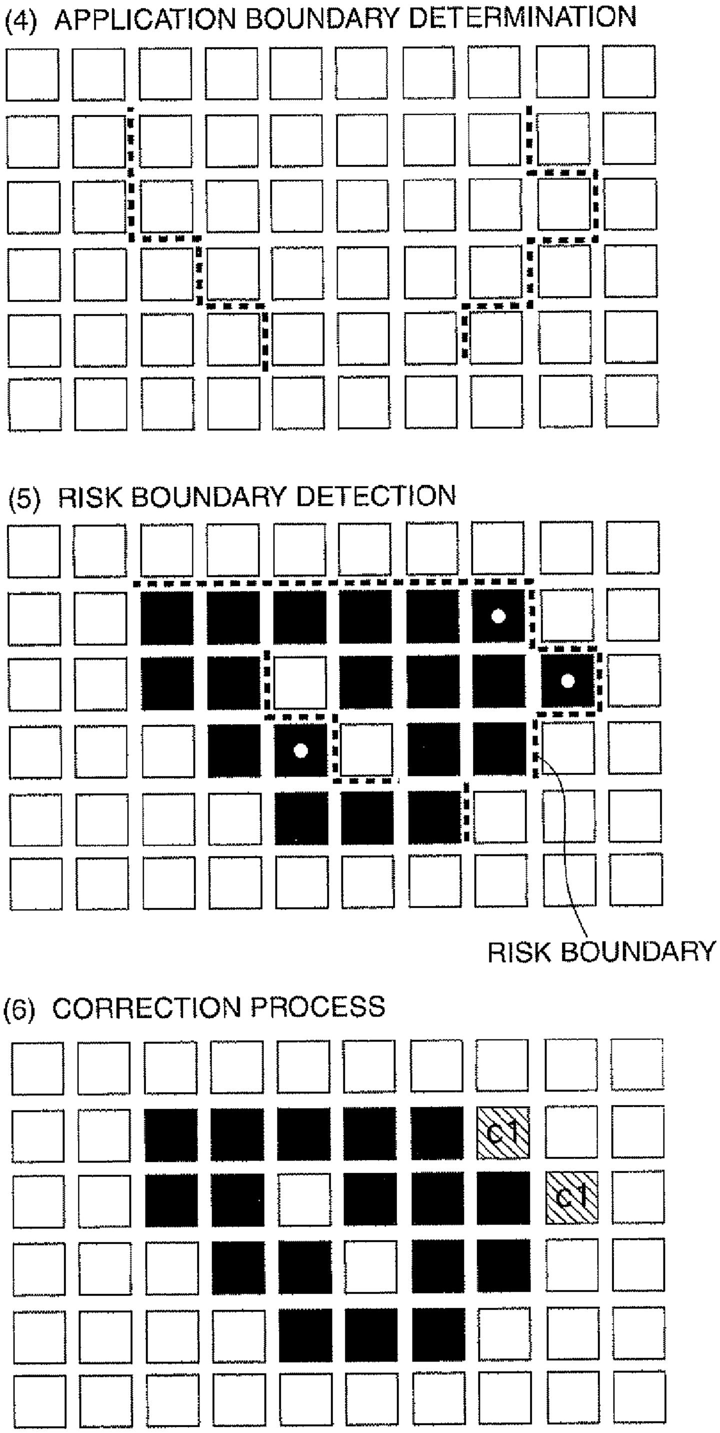
FIG. 20 is a diagram showing the displacement process at the tilt azimuth angle of 225 degrees.

FIG. 20 is a diagram showing a specific example of the process performed by the video processing circuit 30 in the case in which the tilt azimuth angle θb is equal to 225 degrees in the normally black mode of the VA type. The correction section 300 determines the application boundary shown in the part 4 of FIG. 20 based on the part 1 and part 2 of FIG. 13, while the risk boundary detection section 321 detects the risk boundary. In comparison with the case shown in FIG. 14, they are different in the risk boundary, and the point that the dark pixel surrounded by the risk boundary on the upper side and the right side becomes the object of the grayscale level replacement. It should be noted that the advantages are the same as those of the embodiment.

Pixels to be Object of Replacement

In the embodiment described above, there is adopted the configuration of replacing the grayscale level of the dark pixel set to be the object of the replacement with the grayscale level of "c1" if the grayscale level darker than "c1" is designated to the dark pixel. This is because the pixel in which the liquid crystal molecules become in the unstable state due to the low application voltage to the liquid crystal element in the normally black mode is the dark pixel.

Incidentally, in order for preventing the reverse tilt domain from occurring, it might be effective in some cases only to reduce the lateral electrical field generated by the dark pixel and the bright pixel located on both sides of the risk boundary.

Here, in order for reducing the lateral electrical field generated by the dark pixel and the bright pixel, there can be cited the process of correcting the bright pixel to be darker in the normally black mode, and the process of correcting the dark pixel and at the same time correcting the bright pixel to be darker, besides the embodiment.

Therefore, these processes will be explained taking the case in which the tilt azimuth angle θb is equal to 45 degrees in the normally black mode of the VA type as an example.

Case 1: Correction of Higher Voltage Pixel

Firstly, the case of correcting the bright pixel out of the dark pixel and the bright pixel located on both sides of the risk boundary, namely the pixel (the higher voltage pixel) having the higher applied voltage to the liquid crystal element, will be explained.

In this case, it is enough for the discrimination section 314 to discriminate whether or not the pixel represented by the video signal Vid-d is the bright pixel located on the left side or the lower side of the dark pixel specified by the specifying section 322, set the value of the flag Q to "1" if the discrimination result is "Yes," and set it to "0" if the discrimination result is "No." Further, it is also possible in this discrimination to set the value of the flag Q to "1" if the pixel represented by the video signal Vid-d is the bright pixel located on the lower left side of the dark pixel specified by the specifying section 322, or to add the case in which the grayscale level of the dark pixel specified by the specifying section 322 is darker than "c1" to the requirements of the discrimination.

Further, it is possible to adopt the configuration in which the grayscale level designated by the video signal Vid-d is replaced with the level "c2" having a predetermined amount darker if the value of the flag Q is "1" in the selector 312.

Figure 21:
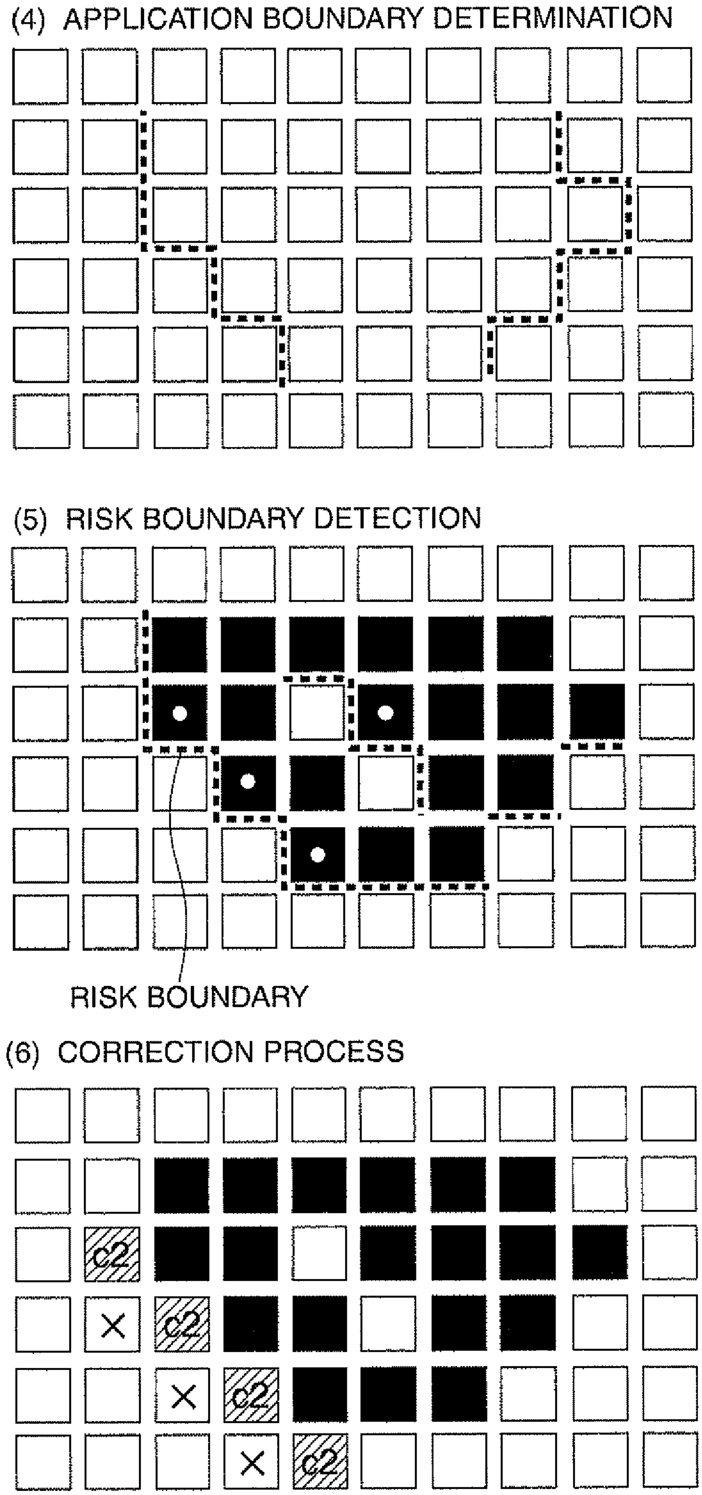
FIG. 21 is a diagram showing another displacement process (part 1) in the video processing circuit.

FIG. 21 is a diagram showing a specific example of the process in the case of replacing the grayscale level of the higher voltage pixel abutting on the risk boundary. The correction section 300 determines the application boundary shown in the part 4 of FIG. 21 based on the part 1 and part 2 of FIG. 13, while the risk boundary detection section 321 detects the risk boundary. In comparison with the case shown in FIG. 14, they are different in the point that the pixel to be the object of the replacement is the bright pixel located on the lower side and the left side of the dark pixel (white circle) surrounded by the risk boundary on the upper side and the right side, and the point that the grayscale level of the bright pixel is replaced with the darker grayscale level of "c2." Since according also to such a process the lateral electrical field to be generated is modified to be smaller, it becomes possible to prevent the reverse tilt domain from occurring.

It should be noted that in the example shown in FIG. 21 it is also possible to replace the grayscale level of the bright pixel (× mark) located on the lower left side of the dark pixel surrounded by the risk boundary on two sides with the grayscale level of "c2."

Case 2: Bilateral Correction Including Higher Voltage Pixel

Figure 22:
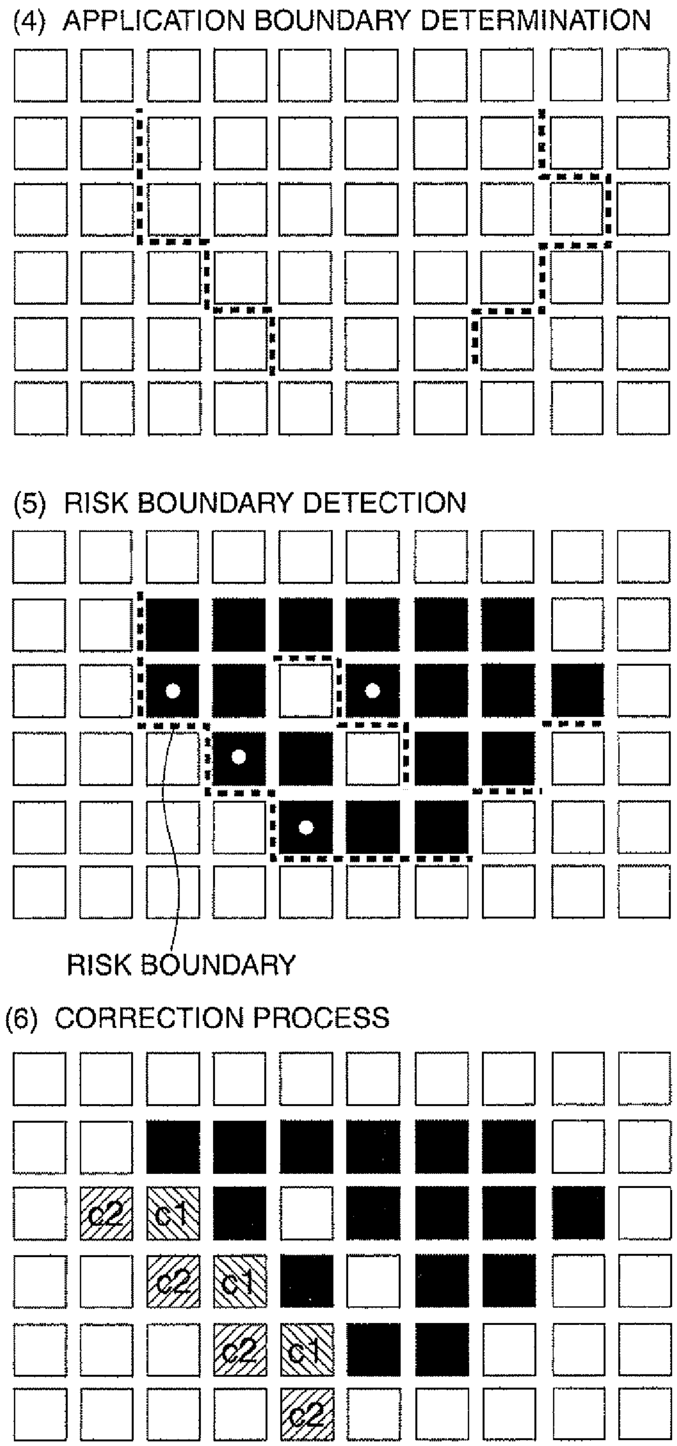
FIG. 22 is a diagram showing another displacement process (part 2) in the video processing circuit.

Subsequently, the case of correcting the dark pixel with a darker level than the grayscale level "c1" and at the same time correcting the bright pixel to be darker will be explained. The correction section 300 determines the application boundary shown in the part 4 of FIG. 22 based on the part 1 and part 2 of FIG. 13, while the risk boundary detection section 321 detects the risk boundary.

The processing result of the process of replacing the pixel in the correction section 300 is the same as what is obtained by performing both of the embodiment described above and the correction of the higher voltage pixel. Therefore, as shown in the part 6 of FIG. 22, the specific example of the process also corresponds to the contents obtained by combining the part 6 of FIG. 14 and the part 6 of FIG. 21.

Since according also to such a process the lateral electrical field to be generated is modified to be smaller, it becomes possible to prevent the reverse tilt domain from occurring.

In particular, since in the present example the grayscale levels of both of the dark pixel and the bright pixel are corrected, the boundary between the dark pixel and the bright pixel represented by the original video signal Vid-in is viewed as the contour of the corrected image without modification. Therefore, in the present example, it becomes possible to prevent the contour information of the image represented by the original video signal Vid-in from being lost by the correction.

Figure 23:
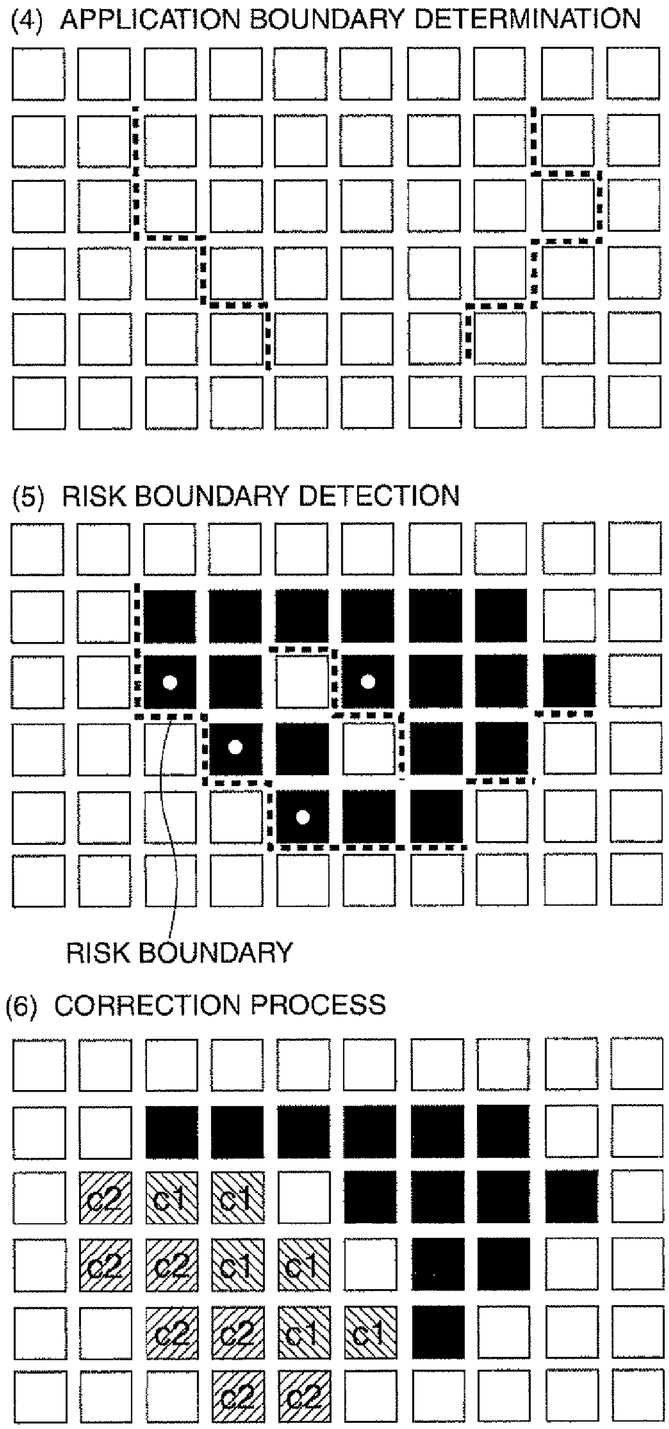
FIG. 23 is a diagram showing another displacement process (part 3) in the video processing circuit.

It should be noted that in the case of correcting the grayscale levels of both of the dark pixel and the bright pixel, it is also possible to correct a plurality of pixels on the dark pixel side in the direction of increasing the distance from the risk boundary, and to correct a plurality of pixels on the bright pixel side in the direction of increasing the distance from the risk boundary as shown in the part 6 of FIG. 23. Further, in the case of correcting the plurality of pixels on the dark pixel side in the direction of increasing the distance from the risk boundary, it is also possible to stop the correction on the bright pixel side.

TN Type

In the embodiment described above, the example of applying the VA type to the liquid crystal 105 is explained. Therefore, an example of applying the TN type to the liquid crystal 105 will hereinafter be explained.

Figure 24A:
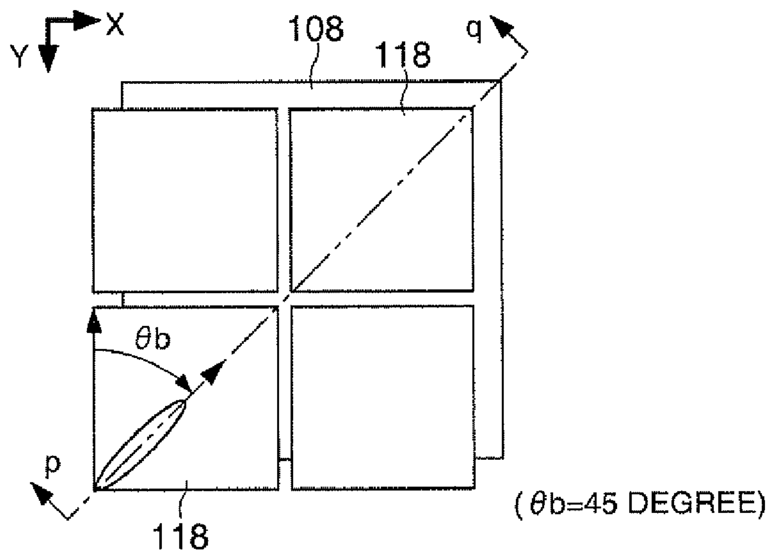
FIGS. 24A and 24B are explanatory diagrams of the initial orientation when a TN method is adopted in the liquid crystal panel.
Figure 24B:
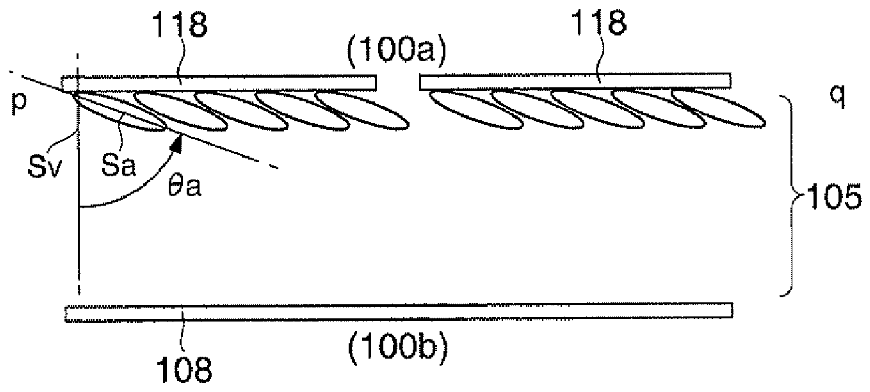

FIG. 24A is a diagram showing 2×2 pixels in the liquid crystal panel 100, and FIG. 24B is a simplified cross-sectional view when breaking the liquid crystal panel 100 with the vertical plane including the line p-q shown in FIG. 24A.

It is assumed that as shown in these drawings, the liquid crystal molecules of the TN type are initially oriented with the tilt angle of θa and the tilt azimuth angle of θb (=45 degrees) in the state in which the electrical potential difference between the pixel electrode 118 and the common electrode 108 is set to zero. In the TN type, in contrast to the VA type, since the liquid crystal molecules tilt in a direction parallel to the substrate, the tilt angle θa of the TN type has a value larger than in the VA type.

In the example of applying the TN type to the liquid crystal 105, the normally white mode in which the liquid crystal element 120 becomes in the white state when no voltage is applied is used in many cases on the ground, for example, that a higher contrast ratio can be obtained.

Figure 4B:
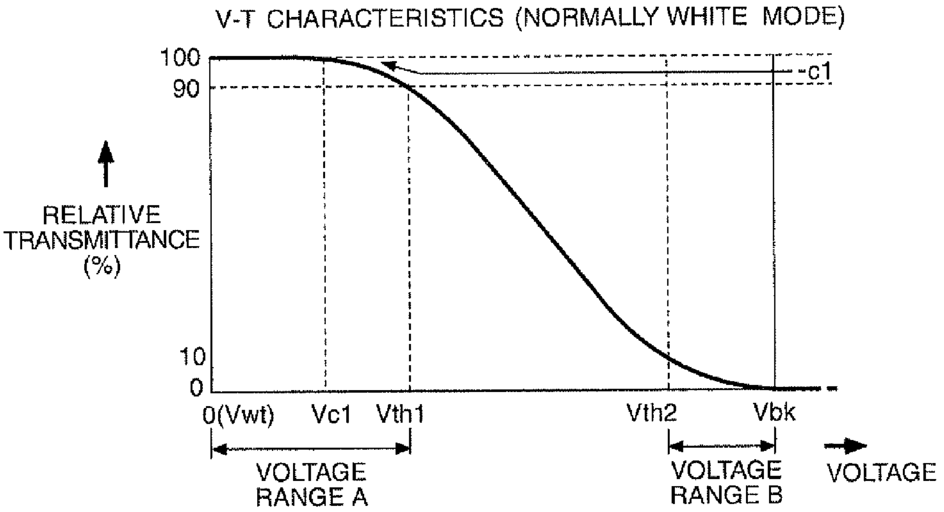

Therefore, in the case of applying the TN type to the liquid crystal 105, and adopting the normally white mode, the relationship between the applied voltage and the transmittance of the liquid crystal element 120 can be expressed by the V-T characteristics shown in FIG. 4B, and the transmittance is reduced as the applied voltage rises. It should be noted that there is no difference from the normally black mode in the point that the liquid crystal molecules become in the unstable state when the applied voltage to the liquid crystal element 120 becomes lower than the voltage Vc.

Figure 25A:
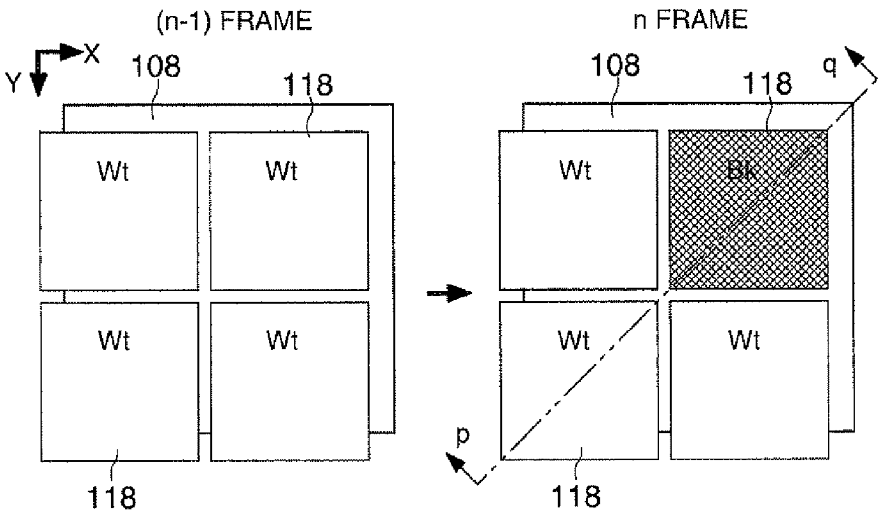
FIGS. 25A through 25C are explanatory diagrams of the reverse tilt generated in the liquid crystal panel.

In such a normally white mode of the TN type, it is assumed that the state of the four pixels of 2×2 changes from the state in which all of the pixels are white pixels having the liquid crystal molecules in the unstable state in the (n−1)-th frame to the state in which the upper right pixel alone is the black pixel in the n-th frame as shown in FIG. 25A.

Figure 25B:
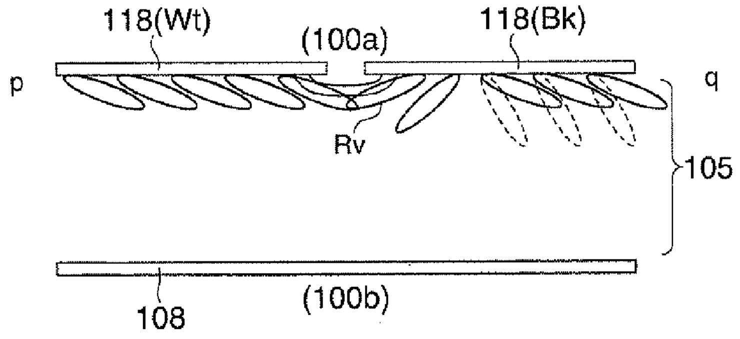

As described above, in the normally white mode the electrical potential difference between the pixel electrode 118 and the common electrode 108 is larger in the black pixel than in the white pixel in contrast to the normally black mode. Therefore, in the upper right pixel to be changed from white to black, the liquid crystal molecules are biased to rise in the direction (the normal direction to the substrate surface) along the electrical field direction from the state illustrated with solid lines to the state illustrated with broken lines as shown in FIG. 25B.

However, the electrical potential difference generated in the gap between the pixel electrode 118 (Wt) of the white pixel and the pixel electrode 118 (Bk) of the black pixel is comparable to the electrical potential difference generated between the pixel electrode 118 (Bk) of the black pixel and the common electrode 108, and moreover, the gap between the pixel electrodes is narrower than the gap between the pixel electrode 118 and the common electrode 108. Therefore, in comparison in the intensity of the electrical field, the lateral electrical field generated in the gap between the pixel electrode 118 (Wt) and the pixel electrode 118 (Bk) is stronger than the vertical electrical field generated between the pixel electrode 118 (Bk) and the common electrode 108.

Since the upper right pixel has been the white pixel with the liquid crystal molecules in the unstable state in the (n−1)-th frame, it takes time until the liquid crystal molecules rise in accordance with the intensity of the vertical electrical field. On the other hand, since the lateral electrical field with the adjacent pixel electrode 118 (Wt) is stronger than the vertical electrical field caused by applying the voltage in the black level to the pixel electrode 118 (Bk), the liquid crystal molecules Rv on the side abutting on the white pixel become in the reverse tilt state in the pixel biased to be changed to the black pixel as shown in FIG. 25B temporally prior to other liquid crystal molecules biased to rise in accordance with the vertical electrical field.

Figure 25C:
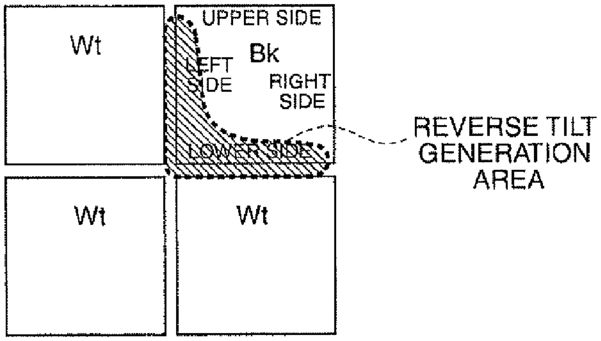

The liquid crystal molecules Rv having become in the reverse tilt state earlier affect negatively the motion of other liquid crystal molecules biased to rise in the direction perpendicular to the substrate as illustrated with the broken lines in accordance with the vertical electrical field. Therefore, the area where the reverse tilt occurs in the pixel to be changed to the black pixel spreads across the wide area beyond the gap between the pixel to be changed to the black pixel and the white pixel so as to eat into the pixel to be changed to the black pixel as shown in FIG. 25C.

Therefore, it results that if the peripheral pixels of the observed pixel to be changed to the black pixel are the white pixels, in the case in which the white pixels abut on the observed pixel on the lower left side, the left side, and the lower side, the reverse tilt domain occurs in the observed pixel on the left side and the lower side.

Figure 26A:
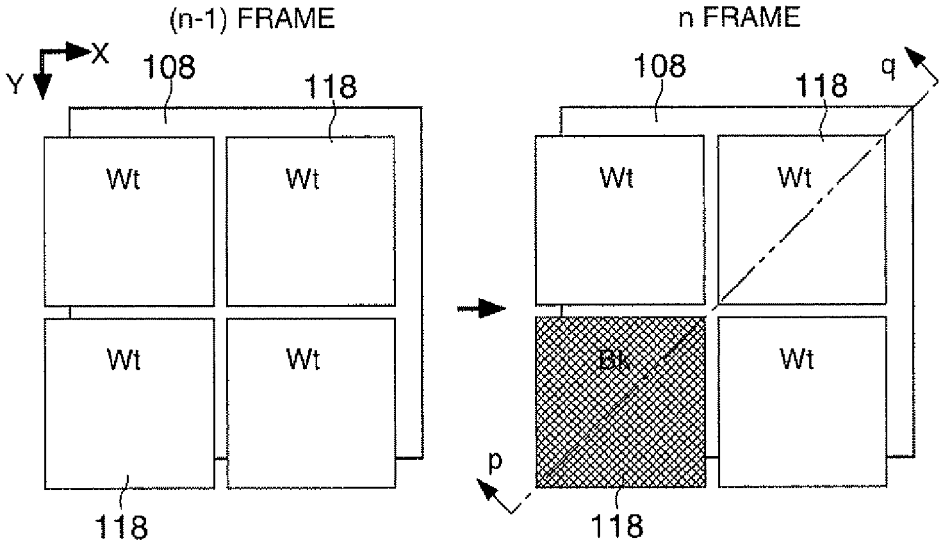
FIGS. 26A through 26C are explanatory diagrams of the reverse tilt generated in the liquid crystal panel.
Figure 26B:
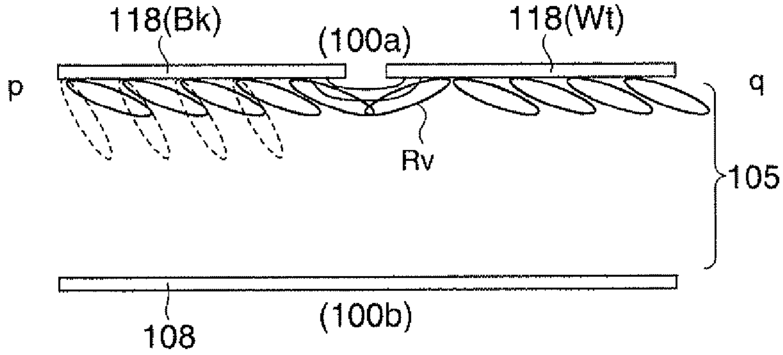
Figure 26C:
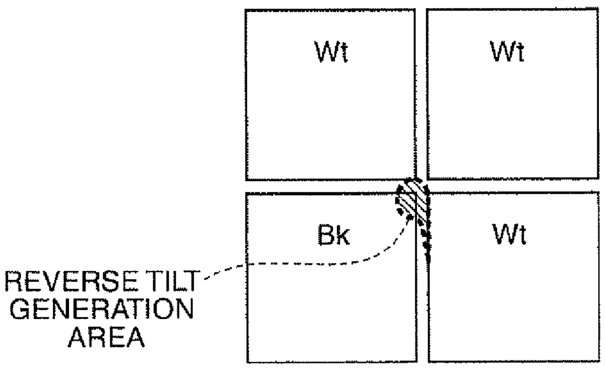

Incidentally, it is assumed that the state of the four pixels of 2×2 changes from the state in which all of the pixels are white pixels having the liquid crystal molecules in the unstable state in the (n−1)-th frame to the state in which the lower left pixel alone is the black pixel in the n-th frame as shown in FIG. 26A. Even in the change described above, the lateral electrical field stronger than the vertical electrical field in the gap between the pixel electrode 118 (Bk) and the common electrode 108 is generated in the gap between the pixel electrode 118 (Bk) of the black pixel and the pixel electrode 118 (Wt) of the white pixel. Due to the lateral electrical field, as shown in FIG. 26B, in the white pixel, the liquid crystal molecules Rv located on the side adjacent to the black pixel are varied in the orientation temporally prior to other liquid crystal molecules biased to rise in accordance with the vertical electrical field, and thus become in the reverse tilt state. However, in the white pixel, since the intensity of the vertical electrical field does not vary from the (n−1)-th frame, other liquid crystal molecules are hardly affected. Therefore, as shown in FIG. 26C, the area where the reverse tilt occurs in the pixel not changing from the white pixel is negligibly narrow compared to the example shown in FIG. 25C.

Further, in the lower left pixel out of the four pixels of 2×2, which changes from white to black, since the initial orientation direction of the liquid crystal molecules is the direction hardly affected by the lateral electrical field, the liquid crystal molecules becoming in the reverse tilt state hardly exist even if the vertical electrical field is applied. Therefore, in the lower left pixel, the liquid crystal molecules correctly rise in the direction perpendicular to the substrate as illustrated with the broken lines in FIG. 26B as the intensity of the vertical electrical field increases. As a result, since the lower left pixel changes to the aimed black pixel, deterioration of the display quality hardly occurs.

In conclusion, in the case in which the tilt azimuth angle θb is equal to 45 degrees in the normally white mode of the TN type, the reverse tilt domain is similar to the case (see FIGS. 19A, 19B, and 20) in which the tilt azimuth angle θb is equal to 225 degrees in the normally black mode of the VA type except the fact that the relationship (V-T characteristics) of black and white with respect to the voltage is reversed.

Figure 27A:
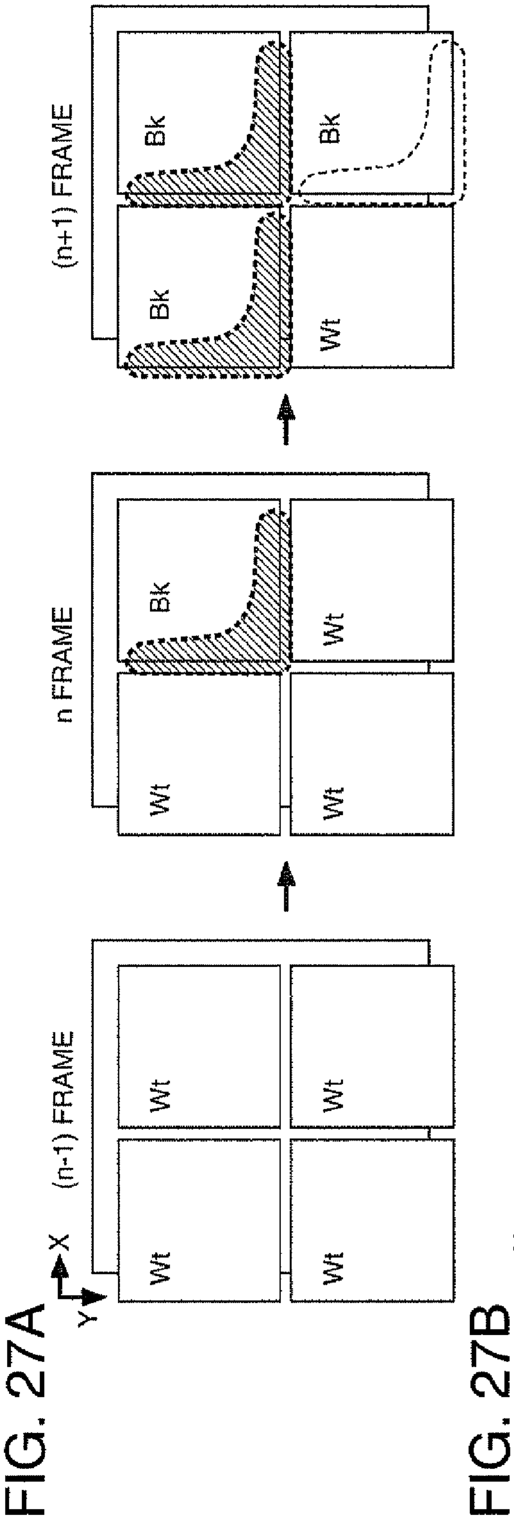
FIGS. 27A and 27B are explanatory diagrams of the reverse tilt generated in the liquid crystal panel.
Figure 27B:
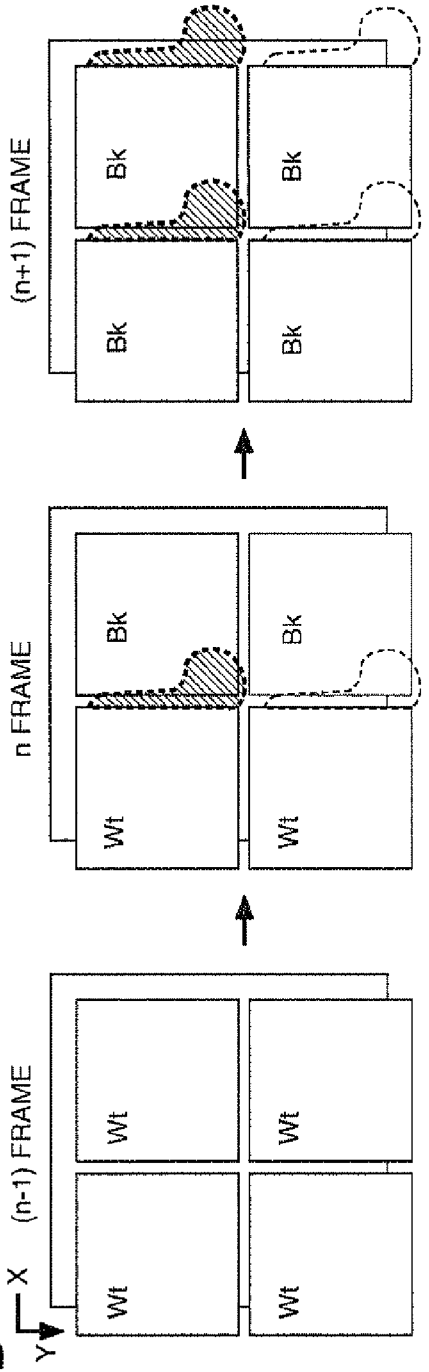

Therefore, in the case in which the tilt angle θb is equal to 45 degrees in the TN type, in view of reducing the pixels constituting the display departure, the following can be obtained from the content shown in FIGS. 27A and 27B, and the analogy of the VA type.

That is, in the case in which the tilt azimuth angle θb is equal to 45 degrees in the normally white mode of the TN type, it is sufficient that, in the boundary on which the bright pixel (the lower voltage pixel) and the dark pixel (the higher voltage pixel) border each other in the image represented by the video signal Vid-in, the portion having the bright pixel located on the upper side and the dark pixel located on the lower side, and the portion having the bright pixel located on the right side and the dark pixel located on the left side are detected as the risk boundary in the n-th frame, and the process of applying the voltage with which the liquid crystal molecules do not become in the unstable state to the liquid crystal element of the bright pixel surrounded by the risk boundary on two sides (i.e., the upper side and the right side) out of the bright pixels abutting on the risk boundary is performed.

It should be noted that although in the present example the example of setting the tilt azimuth angle θb to 45 degrees in the normally white mode of the TN type is explained, taking the point that generation direction of the reverse tilt domain is reversed from the VA type and the point that the V-T characteristics are different into consideration, it must be possible to easily obtain the measures for the case in which the tilt azimuth angle θb is not equal to 45 degrees and the configuration therefor by the analogy of the above explanation.

In the explanation described above, although it is assumed that the video signal Vid-in designates the grayscale levels of the pixels, it is also possible to assume that the video signal Vid-in directly designates the applied voltages to the liquid crystal elements. In the case in which the video signal Vid-in designates the applied voltages to the liquid crystal elements, it is sufficient to adopt the configuration of discriminating the boundary based on the applied voltage thus designated to thereby correct the voltage.

Further, the liquid crystal element 120 is not limited to the transmissive type, but can be of the reflective type.

Further, although the image is for expressing the grayscale from white to black, it is also possible to adopt the configuration of expressing the color of one dot with three pixels respectively colored by the color filter of red (R), green (G), and blue (B), for example. It should be noted that the projector hereinafter explained is for forming the color image by combining the primary color images respectively generated by the three liquid crystal panels.

Electronic Apparatus

Figure 28:
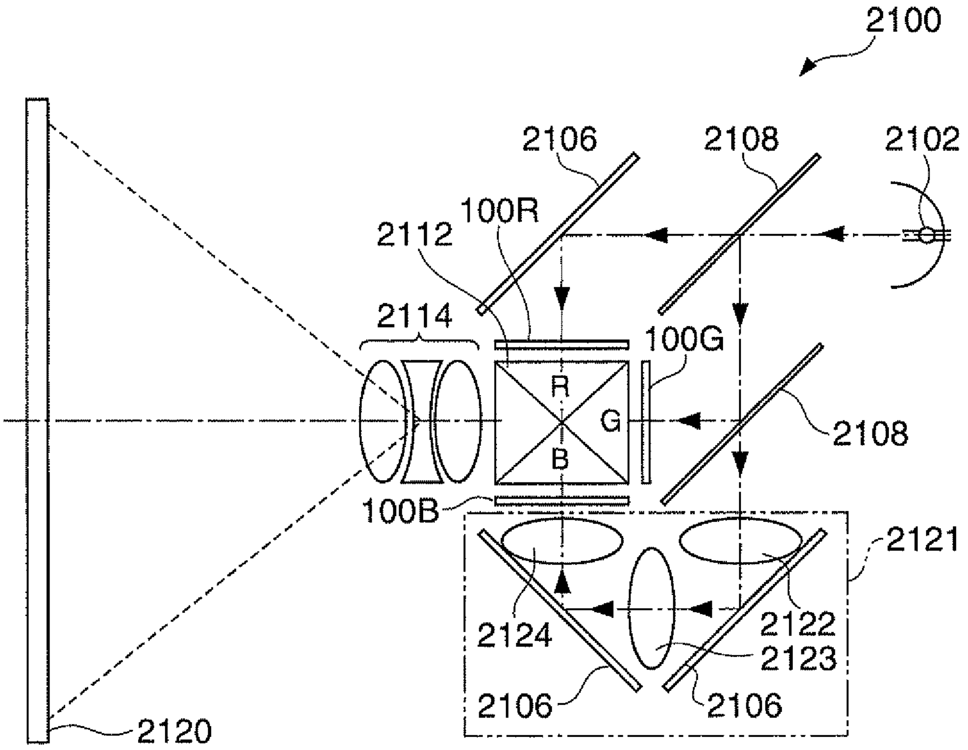
FIG. 28 is a diagram showing a projector to which the liquid crystal display device is applied.

Then, as an example of the electronic apparatus using the liquid crystal display device according to the embodiment described above, a projector using the liquid crystal panels 100 as the light valves will be explained. FIG. 28 is a plan view showing the configuration of the projector.

As shown in the drawing, a lamp unit 2102 composed mainly of a white light source such as a halogen lamp is disposed inside the projector 2100. A projection light beam emitted from the lamp unit 2102 is separated into three primary colors of R (red), G (green), and B (blue) by three mirrors 2106 and two dichroic mirrors 2108 disposed inside thereof, and then respectively guided to the light valves 100R, 100G, and 100B corresponding to the respective primary colors. It should be noted that since the B color light beam has a longer light path compared to the other colors, the R color and G color, and is therefore guided via a relay lens system 2121 composed of an entrance lens 2122, a relay lens 2123, and an exit lens 2124 in order for preventing the loss.

In the projector 2100, the three sets of liquid crystal display devices each including the liquid crystal panel 100 correspond respectively to the R color, G color, and B color. The configuration of each of the light valves 100R, 100G, and 100B is substantially the same as that of the liquid crystal panel 100 described above. There is adopted the configuration in which the video signals for designating the grayscale levels of the respective primary color components of R color, G color, and B color are supplied from respective external higher-level circuits, and the light valves 1008, 100G, and 100B are driven respectively.

The light beams respectively modulated by the light valves 100R, 100G, and 100B enter the dichroic prism 2112 in three directions. Then, in the dichroic prism 2112, the light beams of the R color and B color are refracted 90 degrees while the light beam of the G color goes straight.

Therefore, it results that after the images of the respective primary colors are combined, the color image is projected by the projection lens 2114 to the screen 2120.

It should be noted that since the light beams corresponding respectively to the primary colors of the R color, G color, and B color enter the light valves 1008, 100G, and 100B due to the dichroic mirrors 2108, no color filter is required to be disposed. Further, since the transmission images of the light valves 100R, 100B are reflected by the dichroic prism 2112 and then projected while the transmission image of the light valve 100G is projected directly, there is adopted the configuration in which the horizontal scanning direction of the light valves 100R, 100B is set to the reverse direction of the horizontal scanning direction of the light valve 100G to thereby display the horizontally mirror reversed images.

As an example of applying the liquid crystal panel 100 to the light valve, there can be cited a television set of the rear projection type besides the projector explained above with reference to FIG. 28. Further, the liquid crystal panel 100 can also be applied to a mirror-less interchangeable lens camera, an electronic view finder (EVF) in a video camera, and so on.

Besides the above, as an applicable electronic apparatus, there can be cited a head mount display, a car navigation system, a pager, an electronic organizer, an electronic calculator, a word processor, a workstation, a picture phone, a POS terminal, a digital still camera, a cellular phone, an apparatus equipped with a touch panel, and so on. Further, it is obvious that the liquid crystal display device described above can be applied to the various types of electronic apparatuses cited above.

The entire disclosure of Japanese Patent Application No. 2010-039795, filed Feb. 25, 2010 is expressly incorporated by reference herein.

What is claimed is:

1. A video processing circuit adapted to supply a liquid crystal panel, in which liquid crystal is sandwiched between a first substrate provided with pixel electrodes corresponding respectively to pixels and a second substrate provided with a common electrode, and liquid crystal elements are mainly composed of the respective pixel electrodes, the liquid crystal, and the common electrode, with a video signal adapted to designate applied voltages respectively to the liquid crystal elements pixel by pixel, and to define the applied voltages to the respective liquid crystal elements based on a processed video signal, the video processing circuit comprising:

a boundary detection section adapted to detect a boundary between a first pixel having an applied voltage, which is designated by the video signal input and is lower than a first voltage, and a second pixel having an applied voltage, which is designated by the video signal input and is one of equal to and higher than a second voltage higher than the first voltage, in a present frame and in a previous frame, which is one frame earlier than the present frame, respectively;

an application boundary determination section adapted to determine an application boundary obtained by eliminating an overlap between the boundary of the present frame detected by the boundary detection section and the boundary of the previous frame detected by the boundary detection section from the boundary of the present frame;

a risk boundary detection section adapted to detect a risk boundary, which is a part of a boundary between the first pixel having the applied voltage, which is designated by the video signal input and is lower than the first voltage, and the second pixel having the applied voltage, which is designated by the video signal input and is higher than the second voltage higher than the first voltage, and is determined in accordance with a tilt azimuth direction of the liquid crystal;

a specifying section adapted to specify the first pixel surrounded by the risk boundary on at least two sides out of the first pixels abutting on the risk boundary; and a replacement section adapted to replace the applied voltage designated by the video signal input and applied to the liquid crystal element corresponding to the first pixel, which is specified by the specifying section, abuts on the application boundary determined by the application boundary determination section, and has the applied voltage designated by the video signal input lower than a predetermined third voltage lower than the first voltage, with the third voltage.

2. A video processing circuit adapted to supply a liquid crystal panel, in which liquid crystal is sandwiched between a first substrate provided with pixel electrodes corresponding respectively to pixels and a second substrate provided with a common electrode, and liquid crystal elements are mainly composed of the respective pixel electrodes, the liquid crystal, and the common electrode, with a video signal adapted to designate applied voltages respectively to the liquid crystal elements pixel by pixel, and to define the applied voltages to the respective liquid crystal elements based on a processed video signal, the video processing circuit comprising:

a boundary detection section adapted to detect a boundary between a first pixel having an applied voltage, which is designated by the video signal input and is lower than a first voltage, and a second pixel having an applied voltage, which is designated by the video signal input and is one of equal to and higher than a second voltage higher than the first voltage, in a present frame and in a previous frame, which is one frame earlier than the present frame, respectively;

an application boundary determination section adapted to determine an application boundary obtained by eliminating an overlap between the boundary of the present frame detected by the boundary detection section and the boundary of the previous frame detected by the boundary detection section from the boundary of the present frame;

a risk boundary detection section adapted to detect a risk boundary, which is a part of a boundary between the first pixel having the applied voltage, which is designated by the video signal input and is lower than the first voltage, and the second pixel having the applied voltage, which is designated by the video signal input and is higher than the second voltage higher than the first voltage, and is determined in accordance with a tilt azimuth direction of the liquid crystal;

a specifying section adapted to specify the first pixel surrounded by the risk boundary on at least two sides out of the first pixels abutting on the risk boundary; and a replacement section adapted to replace the applied voltage designated by the video signal input and applied to the liquid crystal element corresponding to the second pixel, which abuts on the first pixel specified by the specifying section, abuts on the application boundary determined by the application boundary determination section, and has the applied voltage designated by the video signal input higher than the second voltage, with a predetermined fourth voltage.

3. A video processing circuit according to claim 1, wherein a replacement section adapted to replace the applied voltage designated by the video signal input and applied to the liquid crystal element corresponding to the second pixel, which abuts on the first pixel specified by the specifying section, abuts on the application boundary determined by the application boundary determination section, and has the applied voltage designated by the video signal input higher than the second voltage, with a predetermined fourth voltage.

4. The video processing circuit according to claim 1, wherein the replacement section replaces the applied voltage to the liquid crystal element corresponding to each of a predetermined plural number of the first pixels, which are specified by the specifying section, and are placed consecutively to at least one first pixel abutting on the application boundary determined by the application boundary determination section toward a side opposite to the application boundary, with the predetermined third voltage.

5. The video processing circuit according to claim 2, wherein the replacement section replaces the applied voltage to the liquid crystal element corresponding to each of a predetermined plural number of the second pixels, which abut on at least one first pixel specified by the specifying section, and are placed consecutively to at least one second pixel abutting on the application boundary determined by the application boundary determination section toward a side opposite to the application boundary, with the predetermined fourth voltage.

6. The video processing circuit according to claim 3, wherein the replacement section replaces the applied voltage to the liquid crystal element corresponding to each of a predetermined plural number of the first pixels, which are specified by the specifying section, and are placed consecutively to at least one first pixel abutting on the application boundary determined by the application boundary determination section toward a side opposite to the application boundary, with the predetermined third voltage, and replaces the applied voltage to the liquid crystal element corresponding to each of a predetermined plural number of the second pixels, which abut on at least one first pixel specified by the specifying section, and are placed consecutively to at least one second pixel abutting on the application boundary determined by the application boundary determination section toward a side opposite to the application boundary, with the predetermined fourth voltage.

7. The video processing circuit according to claim 1, wherein the tilt azimuth direction is a direction from one end of a long axis of a liquid crystal molecule on a side of the pixel electrode toward the other end of the liquid crystal molecule in a plan view from the side of the pixel electrode toward the common electrode.

8. The video processing circuit according to claim 2, wherein the tilt azimuth direction is a direction from one end of a long axis of a liquid crystal molecule on a side of the pixel electrode toward the other end of the liquid crystal molecule in a plan view from the side of the pixel electrode toward the common electrode.

9. The video processing circuit according to claim 3, wherein the tilt azimuth direction is a direction from one end of a long axis of a liquid crystal molecule on a side of the pixel electrode toward the other end of the liquid crystal molecule in a plan view from the side of the pixel electrode toward the common electrode.

10. A liquid crystal display device comprising a video processing circuit according to claim 1.

11. A liquid crystal display device comprising a video processing circuit according to claim 2.

12. A liquid crystal display device comprising a video processing circuit according to claim 3.

13. An electronic apparatus comprising the liquid crystal display device according to claim 10.

14. An electronic apparatus comprising the liquid crystal display device according to claim 11.

15. An electronic apparatus comprising the liquid crystal display device according to claim 12.

16. A video processing method adapted to supply a liquid crystal panel, in which liquid crystal is sandwiched between a first substrate provided with pixel electrodes corresponding respectively to pixels and a second substrate provided with a common electrode, and liquid crystal elements are mainly composed of the respective pixel electrodes, the liquid crystal, and the common electrode, with a video signal adapted to designate applied voltages respectively to the liquid crystal elements pixel by pixel, and to define the applied voltages to the respective liquid crystal elements based on a processed video signal, the video processing method comprising:

(a) detecting a boundary between a first pixel having an applied voltage, which is designated by the video signal input and is lower than a first voltage, and a second pixel having an applied voltage, which is designated by the video signal input and is one of equal to and higher than a second voltage higher than the first voltage, in a present frame and in a previous frame, which is one frame earlier than the present frame, respectively;

(b) determining an application boundary obtained by eliminating an overlap between the boundary of the present frame detected in step (a) and the boundary of the previous frame detected in step (a) from the boundary of the present frame;

(c) detecting a risk boundary, which is a part of a boundary between the first pixel having the applied voltage, which is designated by the video signal input and is lower than the first voltage, and the second pixel having the applied voltage, which is designated by the video signal input and is higher than the second voltage higher than the first voltage, and is determined in accordance with a tilt azimuth direction of the liquid crystal;

(d) specifying the first pixel surrounded by the risk boundary on at least two sides out of the first pixels abutting on the risk boundary; and (e) replacing the applied voltage designated by the video signal input and applied to the liquid crystal element corresponding to the first pixel, which is specified in step (d), abuts on the application boundary determined in step (b), and has the applied voltage designated by the video signal input lower than a predetermined third voltage lower than the first voltage, with the third voltage.

17. A video processing method adapted to supply a liquid crystal panel, in which liquid crystal is sandwiched between a first substrate provided with pixel electrodes corresponding respectively to pixels and a second substrate provided with a common electrode, and liquid crystal elements are mainly composed of the respective pixel electrodes, the liquid crystal, and the common electrode, with a video signal adapted to designate applied voltages respectively to the liquid crystal elements pixel by pixel, and to define the applied voltages to the respective liquid crystal elements based on a processed video signal, the video processing method comprising:

(a) detecting a boundary between a first pixel having an applied voltage, which is designated by the video signal input and is lower than a first voltage, and a second pixel having an applied voltage, which is designated by the video signal input and is one of equal to and higher than a second voltage higher than the first voltage, in a present frame and in a previous frame, which is one frame earlier than the present frame, respectively;

(b) determining an application boundary obtained by eliminating an overlap between the boundary of the present frame detected in step (a) and the boundary of the previous frame detected in step (a) from the boundary of the present frame;

(c) detecting a risk boundary, which is a part of a boundary between the first pixel having the applied voltage, which is designated by the video signal input and is lower than the first voltage, and the second pixel having the applied voltage, which is designated by the video signal input and is higher than the second voltage higher than the first voltage, and is determined in accordance with a tilt azimuth direction of the liquid crystal;

(d) specifying the first pixel surrounded by the risk boundary on at least two sides out of the first pixels abutting on the risk boundary; and (f) replacing the applied voltage designated by the video signal input and applied to the liquid crystal element corresponding to the second pixel, which abuts on the first pixel specified in step (d), abuts on the application boundary determined in step (b), and has the applied voltage designated by the video signal input higher than the second voltage, with a predetermined fourth voltage.

18. A video processing method according to claim 17, wherein (f) replacing the applied voltage designated by the video signal input and applied to the liquid crystal element corresponding to the second pixel, which abuts on the first pixel specified in step (d), abuts on the application boundary determined in step (b), and has the applied voltage designated by the video signal input higher than the second voltage, with a predetermined fourth voltage.

* * * * *